(12) United States Patent
Liu

(10) Patent No.: US 8,715,392 B2
(45) Date of Patent: May 6, 2014

(54) CATALYZED CO$_2$-TRANSPORT MEMBRANE ON HIGH SURFACE AREA INORGANIC SUPPORT

(75) Inventor: Wei Liu, Richland, WA (US)

(73) Assignee: Battelle Memorial Institute, Richland, WA (US)

(\*) Notice: Subject to any disclaimer, the term of this patent is extended or adjusted under 35 U.S.C. 154(b) by 782 days.

(21) Appl. No.: 12/901,119

(22) Filed: Oct. 8, 2010

(65) Prior Publication Data

US 2011/0052466 A1    Mar. 3, 2011

Related U.S. Application Data

(63) Continuation-in-part of application No. 12/470,294, filed on May 21, 2009.

(60) Provisional application No. 61/259,861, filed on Nov. 10, 2009.

(51) Int. Cl.
*B01D 53/22* (2006.01)
*B01D 53/14* (2006.01)
*B01D 53/62* (2006.01)
*B01J 8/00* (2006.01)

(52) U.S. Cl.
USPC .................. 95/51; 95/44; 95/236; 96/4; 96/5; 96/7; 96/11; 423/230; 422/187

(58) Field of Classification Search
USPC ......... 95/44, 51, 236; 96/4, 5, 11, 7; 423/230; 422/187
See application file for complete search history.

(56) References Cited

U.S. PATENT DOCUMENTS

| | | |
|---|---|---|
| 2,437,422 A | 3/1948 | Dunham |
| 4,132,837 A | 1/1979 | Soffer |
| 4,525,704 A | 6/1985 | Campbell et al. |

(Continued)

FOREIGN PATENT DOCUMENTS

| | | |
|---|---|---|
| JP | 63-105469 | 5/1988 |
| JP | 2001-120940 | 5/2001 |

(Continued)

OTHER PUBLICATIONS

International Search Report and Written Opinion for PCT/US2011/031342 (Mailed Jul. 27, 2011).

(Continued)

*Primary Examiner* — Jason M Greene
(74) *Attorney, Agent, or Firm* — Klarquist Sparkman, LLP

(57) ABSTRACT

Disclosed are membranes and methods for making the same, which membranes provide improved permeability, stability, and cost-effective manufacturability, for separating CO$_2$ from gas streams such as flue gas streams. High CO$_2$ permeation flux is achieved by immobilizing an ultra-thin, optionally catalyzed fluid layer onto a meso-porous modification layer on a thin, porous inorganic substrate such as a porous metallic substrate. The CO$_2$-selective liquid fluid blocks non-selective pores, and allows for selective absorption of CO$_2$ from gas mixtures such as flue gas mixtures and subsequent transport to the permeation side of the membrane. Carbon dioxide permeance levels are in the order of $1.0 \times 10^{-6}$ mol/(m$^2$sPa) or better. Methods for making such membranes allow commercial scale membrane manufacturing at highly cost-effective rates when compared to conventional commercial-scale CO$_2$ separation processes and equipment for the same and such membranes are operable on an industrial use scale.

22 Claims, 14 Drawing Sheets

(56) References Cited

U.S. PATENT DOCUMENTS

| | | | |
|---|---|---|---|
| 4,781,889 | A | 11/1988 | Fukasawa et al. |
| 4,799,936 | A | 1/1989 | Riley |
| 4,895,774 | A | 1/1990 | Ohzu et al. |
| 5,019,263 | A | 5/1991 | Haag et al. |
| 5,110,694 | A | 5/1992 | Nagasubramanian et al. |
| 5,130,211 | A | 7/1992 | Wilkinson et al. |
| 5,194,158 | A | 3/1993 | Matson |
| 5,206,095 | A | 4/1993 | Donado et al. |
| 5,296,318 | A | 3/1994 | Gozdz et al. |
| 5,510,209 | A | 4/1996 | Abraham et al. |
| 5,698,339 | A | 12/1997 | Kawakami et al. |
| 5,716,527 | A | 2/1998 | Decman et al. |
| 5,985,475 | A | 11/1999 | Reynolds et al. |
| 6,083,297 | A * | 7/2000 | Valus et al. ............... 95/44 |
| 6,326,326 | B1 | 12/2001 | Feng et al. |
| 6,464,742 | B1 | 10/2002 | Leung et al. |
| 6,846,554 | B2 | 1/2005 | Fryxell et al. |
| 6,929,705 | B2 | 8/2005 | Myers et al. |
| 6,946,015 | B2 | 9/2005 | Jorgensen et al. |
| 7,014,948 | B2 | 3/2006 | Lee et al. |
| 7,740,965 | B2 | 6/2010 | Richards et al. |
| 2002/0050054 | A1 | 5/2002 | Noh |
| 2004/0149127 | A1 | 8/2004 | Lyons et al. |
| 2004/0247996 | A1 | 12/2004 | Smith et al. |
| 2005/0003957 | A1 | 1/2005 | Vaughn et al. |
| 2007/0160898 | A1 | 7/2007 | Takamura et al. |
| 2008/0115667 | A1 | 5/2008 | Lee et al. |
| 2008/0210087 | A1* | 9/2008 | Ku et al. ............... 95/51 |
| 2009/0053594 | A1 | 2/2009 | Johnson et al. |
| 2009/0053607 | A1 | 2/2009 | Jeong et al. |
| 2010/0190043 | A1 | 7/2010 | Nakanishi |
| 2010/0297531 | A1 | 11/2010 | Liu et al. |
| 2010/0304953 | A1 | 12/2010 | Liu et al. |
| 2011/0059355 | A1 | 3/2011 | Zhang et al. |
| 2011/0059364 | A1 | 3/2011 | Zhang et al. |
| 2011/0114254 | A1 | 5/2011 | Xu et al. |
| 2011/0155662 | A1 | 6/2011 | Liu et al. |
| 2012/0180945 | A1 | 7/2012 | Zhang et al. |

FOREIGN PATENT DOCUMENTS

| | | | |
|---|---|---|---|
| JP | 2008-036463 | | 2/2008 |
| JP | 2008-36463 | * | 2/2008 ............ B01D 71/38 |
| WO | WO00/53297 | | 9/2000 |
| WO | WO2006/049940 | | 5/2006 |
| WO | WO2006/050531 | | 5/2006 |
| WO | WO2009/005745 | | 1/2009 |
| WO | WO2009/013629 | | 1/2009 |

OTHER PUBLICATIONS

PCT Application No. PCT/US2011/031342, filed Apr. 6, 2011, 42 pages.
Final Office action from U.S. Patent and Trademark Office for U.S. Appl. No. 12/557,455, mailed Nov. 8, 2012.
Office action from U.S. Patent and Trademark Office for U.S. Appl. No. 12/557,452, mailed Dec. 6, 2012.
International Search Report and Written Opinion for PCT/US2010/035543 (Mailed Dec. 6, 2010).
International Search Report and Written Opinion for PCT/US2010/041213 (Mailed Feb. 8, 2011).
International Search Report and Written Opinion for PCT/US2010/041214 (Mailed Feb. 8, 2011).
Bao, L. et al., "Facilitated transport of $CO_2$ across a liquid membrane: Comparing enzyme, amine, and alkaline," *Journal of Membrane Science*, vol. 280, pp. 330-334 (Mar. 2, 2006).
Bara, J. et al., "Guide to $CO_2$ Separations in Imidazolium-Based Room-Temperature Ionic Liquids," *Ind. Eng. Chem. Res.*, vol. 48, No. 6, pp. 2739-2751 (Feb. 11, 2009).
Camper, D. et al., "Bulk-fluid solubility and membrane feasibility of Rmim-based room-temperature ionic liquids," *Ind. Eng. Che. Res.*, vol. 45, pp. 6279-6283 (Aug. 8, 2006).
Chen, H. et al., "Immobilized glycerol-based liquid membranes in hollow fibers for selective $CO_2$ separation from $CO_2$-$N_2$ mixtures," *Journal of Membrane Science*, vol. 183, No. 1, pp. 75-88 (Feb. 28, 2001).
Deng, L. et al., "Facilitated transport of $CO_2$ in novel PVAm/PVA blend membrane," *J. Mem. Sci.*, vol. 340, pp. 154-163 (May 23, 2009).
Dong, J. et al., "Multicomponent Hydrogen/Hydrocarbon Separation by MFI-Type Zeolite Membranes," *AIChE Journal*, vol. 46, No. 10, pp. 1957-1966 (Oct. 2000).
El-Azzami, L.A. et al., "Parametric Study of $CO_2$ Fixed Carrier Facilitated Transport through Swollen Chitosan Membranes," *Ind.& Eng. Chem. Res.*, vol. 48, No. 2, pp. 894-902 (Jan. 21, 2009).
Favre, E., "Carbon dioxide recovery from post-combustion processes: Can gas permeation membranes compete with absorption," *Journal of Membrane Science*, vol. 294, Nos. 1-2, pp. 50-59 (Feb. 9, 2007).
Gu, X. et al., "Synthesis of Defects-Free FAU-Type Zeolite Membranes and Separation for Dry and Moist $CO_2$/$N_2$ Mixtures," *Ind. Eng. Chem. Res.*, vol. 44, No. 4, pp. 937-944 (Feb. 16, 2005).
Gu, Y. et al., "Ionic liquids-based catalysis with solids: state of the art," *Adv. Synth. Catal.*, vol. 351, pp. 817-847 (Apr. 6, 2009).
Hanioka, S. et al., "$CO_2$ separation facilitated by task-specific ionic liquids using a supported liquid membrane," *Journal of Membrane Science*, vol. 314, pp. 1-4 (Jan. 24, 2008).
Harlick, P.J.E. et al., "Applications of Pore-Expanded Mesoporous Silicas. 3. Triamine Silane Grafting for Enhanced $CO_2$ Adsorption," *Ind. Eng. Chem. Res.*, vol. 45, pp. 3248-3255 (Mar. 22, 2006).
Harlick, P.J.E. et al., "Applications of Pore-Expanded Mesoporous Silica. 5. Triamine Grafted Material with Exceptional $CO_2$ Dynamic and Equilibrium Adsorption Performance," *Ind. Eng. Chem. Res.*, vol. 46, pp. 446-458 (Jan. 17, 2007).
Harris, F. et al., "Solubilities of Carbon Dioxide and Densities off Aqueous Sodium Glycinate Solutions before and after $CO_2$ Absorption," *J. Chem. Eng. Data*, vol. 54, pp. 144-147 (Jan. 8, 2009).
Huang, J. et al., "Carbon Dioxide Capture Using a $CO_2$-Selective Facilitated Transport Membrane," *Ind. Eng. Chem. Res.*, vol. 47, No. 4, pp. 1261-1267 (Jan. 16, 2008).
Hwang, K. et al., "Reaction kinetics between carbon dioxide and glycidyl methacrylate using trihexylamine immobilized ionic liquid on MCM41 catalyst," *J. Ind. and Eng. Chem.*, vol. 15, pp. 854-859 (Nov. 25, 2009).
Ilconich, J. et al., "Experimental investigation of the permeability and selectivity of supported ionic liquid membranes for $CO_2$/He separation at temperatures up to 125° C.," *Journal of Membrane Science*, vol. 298, pp. 41-47 (Apr. 6, 2007).
Kai, T. et al., "Development of cesium-incorporated carbon membranes for $CO_2$ separation under humid conditions," *Journal of Membrane Science*, vol. 342, pp. 14-21 (Jun. 17, 2009).
Koros, W. et al., "Pushing the limits on possibilities for large scale gas separation: which strategies?," *Journal of Membrane Science*, vol. 175, No. 2, pp. 181-196 (Aug. 10, 2000).
Koros, W. et al., "Pushing the limits on possibilities for large scale gas separation: which strategies?," *Journal of Membrane Science*, vol. 181, p. 141 (Jan. 15, 2001).
Li, L. et al., "Stabilization of Metal Nanoparticles in Cubic Mesostructured Silica and Its Application in Regenerable Deep Desulfurization of Warm Syngas," *Chem. Mater.*, vol. 21, pp. 5358-5364 (Oct. 22, 2009).
Li, Y. et al., "Pervaporation and vapor permeation dehydration of Fischer-Tropsch mixed-alcohols by LTA zeolite membranes," *Separation and Purification Technology*, vol. 57, p. 140-146 (Oct. 1, 2007).
Lin, H. et al., "Materials selection guidelines for membranes that remove $CO_2$ from gas mixtures," *Journal of Molecular Structure*, vol. 739, pp. 57-74 (Apr. 2005).
Liu, W. et al., "Critical Material and Process Issues for $CO_2$ Separation from Coal-Powered Plants," *JOM*, vol. 41, No. 4, pp. 36-44 (Apr. 2009).
Luis, P. et al., "Facilitated transport of $CO_2$ and $SO_2$ through Supported Ionic Liquid Membranes (SILMs)," *Desalination*, vol. 245, pp. 485-493 (Sep. 15, 2009).

(56) References Cited

OTHER PUBLICATIONS

Masuda, T. et al., "Preparation of hydrophilic and acid-proof silicalite-1 zeolite membrane and its application to selective separation of water from water solutions of concentrated acetic acid by pervaporation," *Separation and Purification Technology*, vol. 32, p. 181-189 (Jul. 1, 2003).

Mineo, P.G. et al., "Very fast $CO_2$ response and hydrophobic properties of novel poly(ionic liquid)s," *J. of Materials Chem.*, vol. 19, No. 46, pp. 8861-8870 (Oct. 19, 2009).

Morigami, Y. et al., "The first large-scale pervaporation plant using tubular-type module with zeolite NaA membrane," *Separation and Purification Technology*, vol. 25, p. 251-260 (Oct. 1, 2001).

National Energy Technology Laboratory (NETL) "Carbon Dioxide Capture from Existing Coal-Fired Power Plants," DOE/NETL-401/110907, Final Report (Original Issue Date, Dec. 2006), Revision Date, Nov. 2007.

National Energy Technology Laboratory (NETL), "Cost and Performance Baseline for Fossil Energy Plants," DOE/NETL-2007/1281, vol. 1: Bituminous Coal and Natural Gas to Electricity, Final Report (Original Issue Date, May 2007), Revision 1, Aug. 2007.

Sandru, M. et al., "Composite hollow fiber membranes for $CO_2$ capture," *Journal of Membrane Science*, vol. 346, pp. 172-186 (Jan. 1, 2010).

Sebastian, V. et al., "Zeolite membrane for $CO_2$ removal: Operating at high pressure," *Journal of Membrane Science*, vol. 292, pp. 92-97 (Jan. 24, 2007).

Shekhawat, D. et al., "A Review of Carbon Dioxide Selective Membranes," *US DOE Topical Report*, DOE/NETL-2003/1200 (Dec. 1, 2003).

Tang, J. et al., "Enhanced $CO_2$ Absorption of Poly(ionic liquid)s," *Macromolecules*, vol. 38, pp. 2037-2039 (Feb. 18, 2005).

Tang, J. et al., "Low-temperature $CO_2$ sorption in ammonium-based poly(ionic liquid)s," *Polymer*, vol. 46, pp. 12460-12467 (Nov. 4, 2005).

Ward, W. et al, "Carbon Dioxide-Oxygen Separation: Facilitated Transport of Carbon Dioxide Across a Liquid Film," *Science*, vol. 156, pp. 1481-1484 (Jun. 16, 1967).

Xomeritakis, G. et al, "Tubular ceramic-supported sol-gel silica-based membranes for flue gas carbon dioxide capture and sequestration," *Journal of Membrane Science*, vol. 341, pp. 30-36 (May 23, 2009).

Yan, T.Y. et al., "Adsorption of $CO_2$ on the Rutile (110) Surface in Ionic Liquid. A Molecular Dynamics Simulation," *J. of Phys. Chem. C*, vol. 113, No. 45, pp. 19389-19392 (Oct. 19, 2009).

Yegani, R. et al., "Selective separation of $CO_2$ by using novel facilitated transport membrane at elevated temperatures and pressures," *Journal of Membrane Science*, vol. 291, pp. 157-164 (Jan. 18, 2007).

Yokozeki, A. et al., "Hydrogen purification using room-temperature ionic liquids," *Applied Energy*, vol. 84, pp. 351-361 (Mar. 2007).

Yu, G. et al., "Design of task-specific ionic liquids for capturing $CO_2$: A molecular orbital study," *Ind. Eng. Chem. Res*, vol. 45, No. 8, pp. 2875-2880 (Feb. 24, 2006).

Yu, G.R. et al., "Structure, Interaction and Property of Amino-Functionalized Imidazolium ILs by Molecular Dynamics Simulation and Ab Initio Calculation," *AIChE J.*, vol. 53, No. 12, pp. 3210-3221 (Dec. 2007).m.

Zhang, J. et al., "Supported Absorption of $CO_2$ by Tetrabutylphosphonium Amino Acid Ionic Liquids," *Chem. Eur. Journal*, vol. 12, pp. 4021-4026 (May 15, 2006).

Zhang, S. et al., "Fixation and conversion of $CO_2$ using ionic liquids," *Catalysis Today*, vol. 115, pp. 61-69 (Mar. 29, 2006).

Zhang, Y. et al., "Dual Amino-Functionalised Phosphonium Ionic Liquids for $CO_2$ Capture," *Chem. Eur. J.*, vol. 15, pp. 3003-3011 (Mar. 9, 2009).

Zheng, F. et al., "Ethylenediamine-Modified SBA-15 as Regenerable $CO_2$ Sorbent," *Ind. & Eng. Chem. Res.*, vol. 44, pp. 3099-3105 (Mar. 25, 2005).

Zou, J. et al., "$CO_2$-selective polymeric membranes containing amines in crosslinked poly(vinyl alcohol)," *Journal of Membrane Science*, vol. 286, pp. 310-321 (Oct. 10, 2006).

Final Office action from U.S. Patent and Trademark Office for U.S. Appl. No. 12/621,410, mailed Jul. 6, 2012.

Office action from U.S. Patent and Trademark Office for U.S. Appl. No. 12/470,294, mailed Apr. 26, 2012.

Office action from U.S. Patent and Trademark Office for U.S. Appl. No. 13/414,641, mailed Jul. 16, 2012.

Restriction Requirement from U.S. Patent and Trademark Office for U.S. Appl. No. 12/557,452, mailed Aug. 10, 2012.

Wei et al., "Influence of electrode structure on the performance of a direct methanol fuel cell," *Journal of Power Sources*, vol. 106, Issues 1-2, pp. 364-369 (Apr. 2002).

International Search Report and Written Opinion for PCT/US2010/052170 (Mailed Jan. 28, 2011).

Barras, "Breathing batteries could store 10 times the energy," *NewScientist*, 2 pages (May 19, 2009).

Dobley et al., "Non-aqueous Lithium-Air Batteries with an Advanced Cathode Structure," 4 pages (publication believed to be Dec. 7, 2004).

Dobley et al., "Lithium-Air Cells and Systems," *Proceedings of the 43rd Power Sources Conference*, pp. 23-25, Philadelphia, PA, (Jul. 7-10, 2008).

Foster et al., "Chelating Agents as Electrolyte Additives for Lithium-Ion Batteries," Army Research Laboratory, 18 pages, Mar. 1999.

Kowalczk et al., "Li-air batteries: A classic example of limitations owing to solubilities," *Pure Appl. Chem.*, vol. 79, No. 5, pp. 851-860 (2007).

Read, "Characterization of the Lithium/Oxygen Organic Electrolyte," *Journal of the Electrochemical Society* vol. 149, No. 9, pp. A1190-A1195 (2002).

Read, "Ether-Based Electrolytes for the Lithium/Oxygen Organic Electrolyte Battery," *Journal of the Electrochemical Society*, vol. 153, No. 1, pp. A96-A100 (2006).

Shin et al., "Three-Dimensional Porous Copper-Tin Alloy Electrodes for Rechargeable Lithium Batteries," *Adv. Funct. Mater.*, vol. 15, No. 4, pp. 582-586, Apr. 2005.

Final Office action from U.S. Patent and Trademark Office for U.S. Appl. No. 12/470,294, mailed Jun. 10, 2013.

Notice of Allowance from U.S. Patent and Trademark Office for U.S. Appl. No. 12/470,294, mailed Oct. 1, 2013.

\* cited by examiner

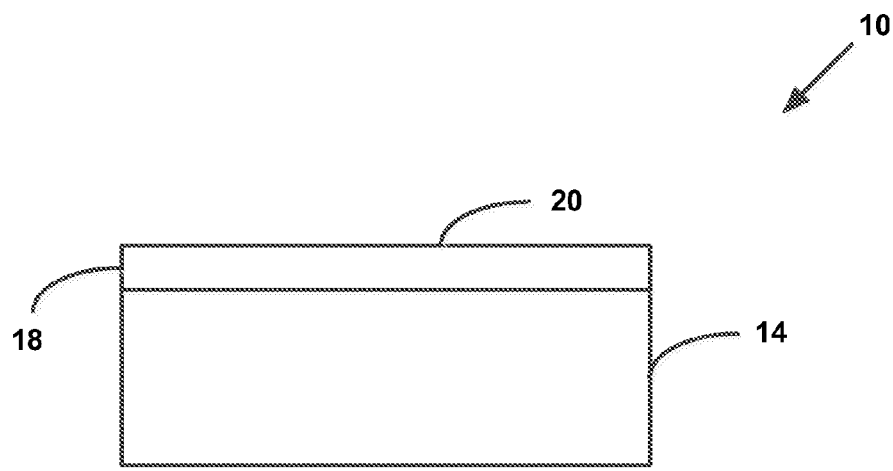
FIG. 1a
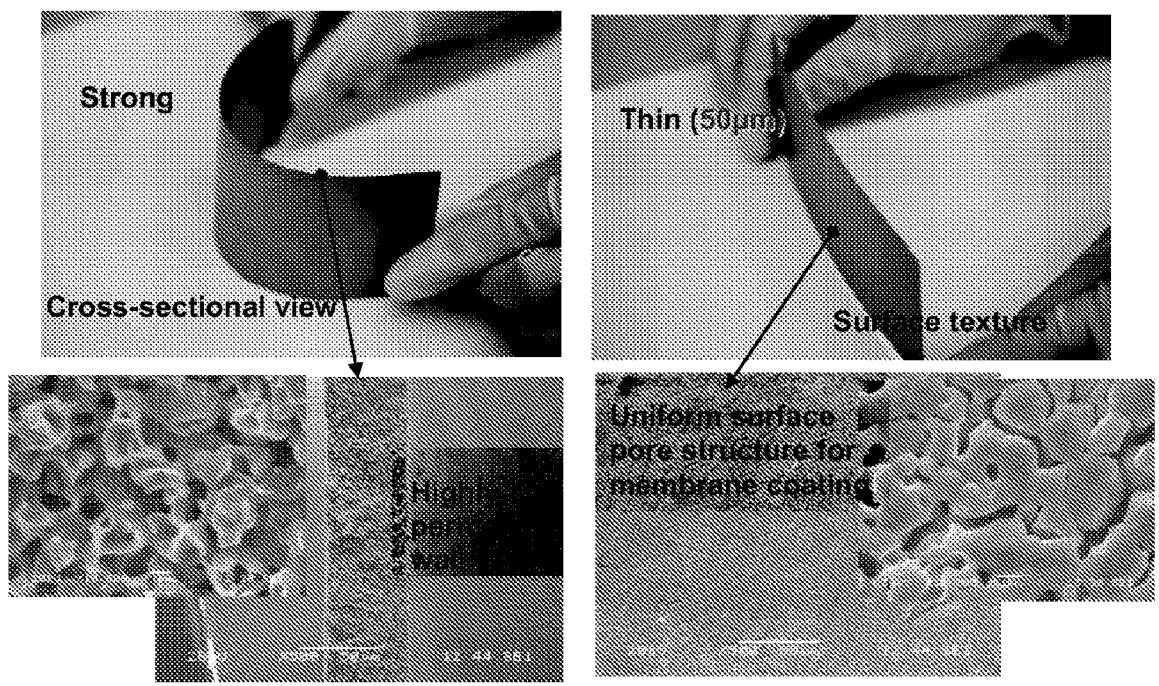
FIG. 1b
FIG. 1c (a) Silicalite zeolite membrane (b) Meso-porous metal oxide coatings

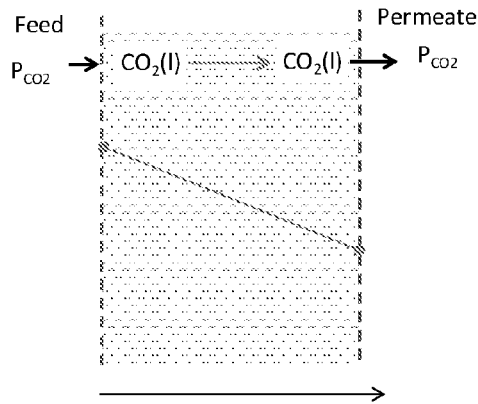
(a) Simple solute-diffusion model
FIG. 4a
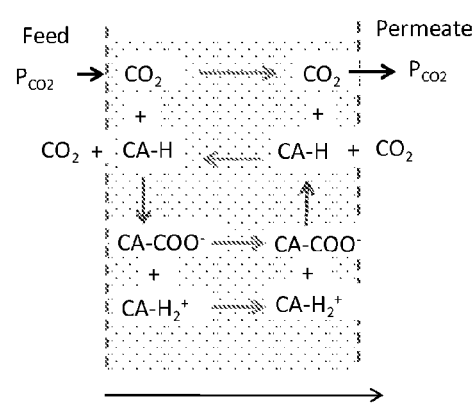
(b) Catalyzed, facilitated transport model
FIG. 4b
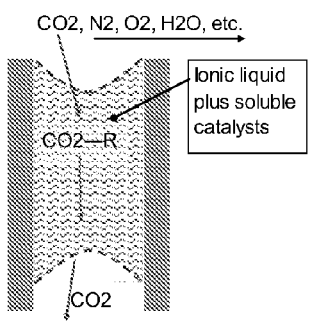
(a) Fluid with soluble catalysts immobilized in meso-pores
FIG. 5a
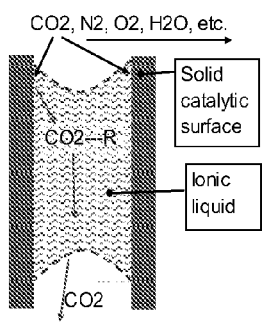
(b) Fluid immobilized in meso-pores of catalytic solids
FIG. 5b
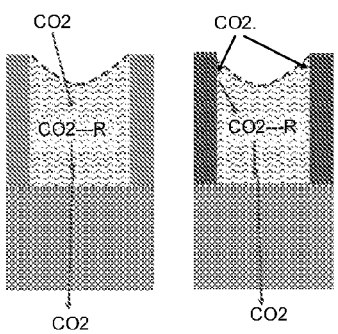
(c) & (d) Immobilized ionic liquid on a macro-porous
FIG. 5c      FIG. 5d

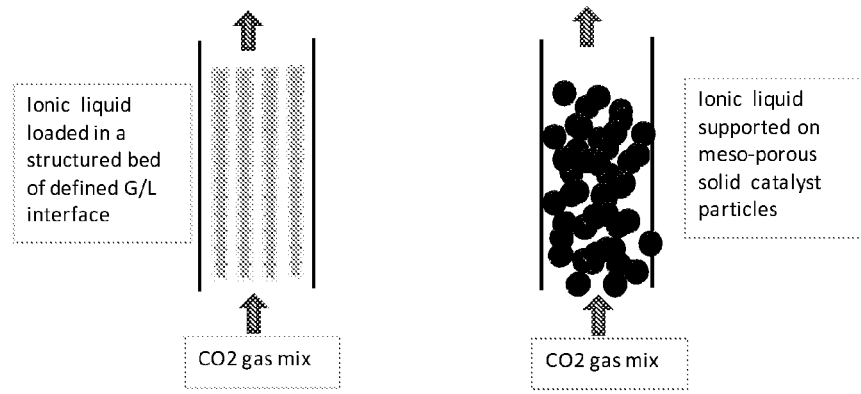
FIG. 6a  FIG. 6b
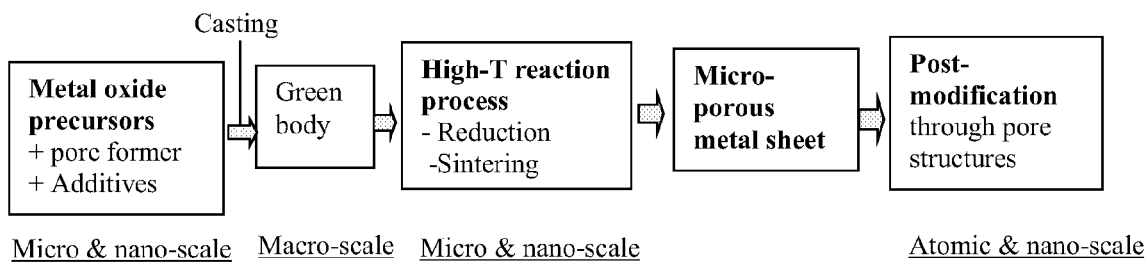
FIG. 7

Tapecasted metal sheet

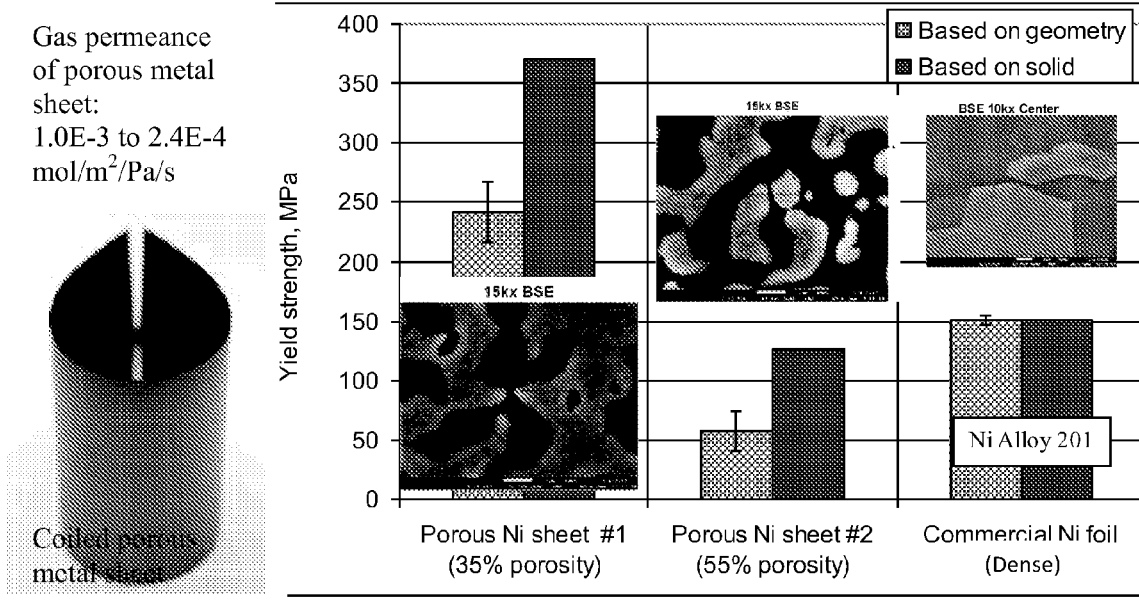
FIG. 13a  FIG. 13b
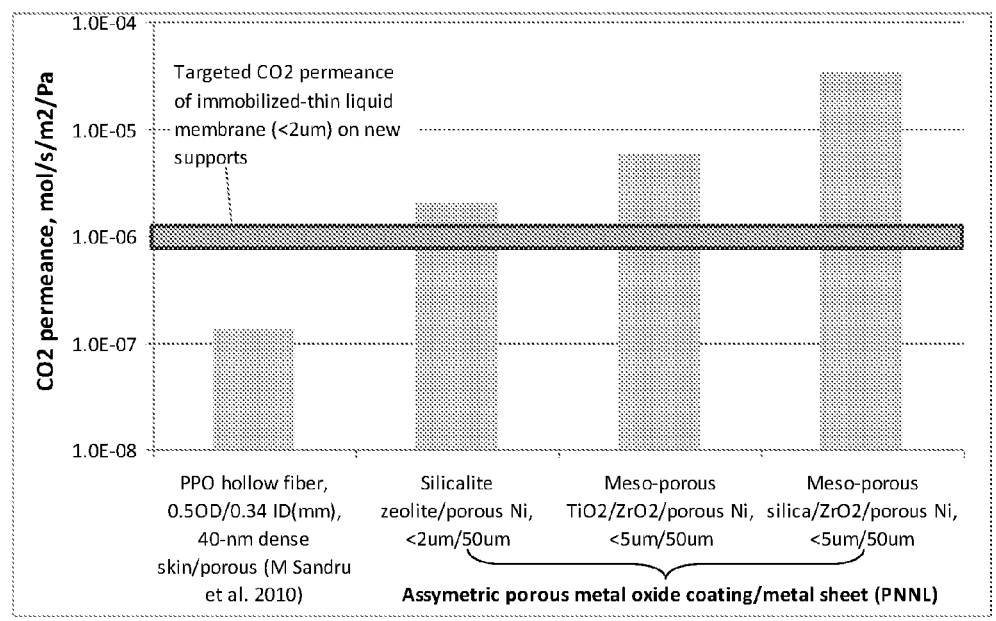
FIG. 14

Molecular structure:

(a) ACID GAS REMOVAL UNIT (b) Membrane separation unit

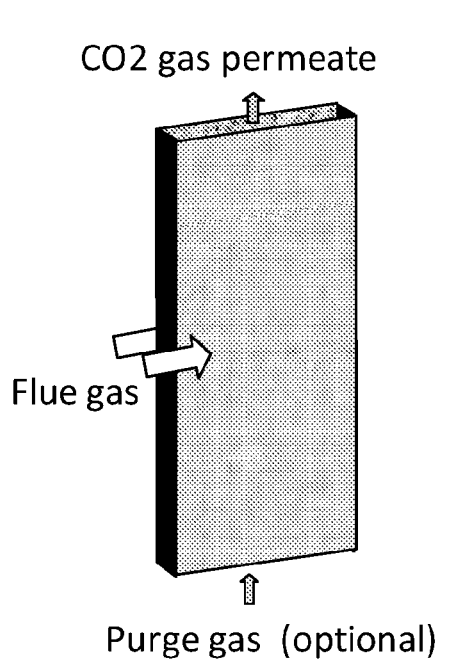
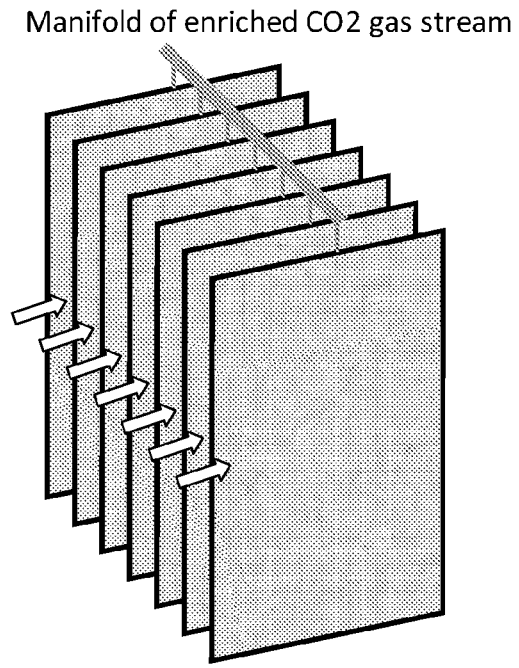
(a) Individual membrane unit
(b) membrane module assembled from a number of units
FIG. 18a
FIG. 18b
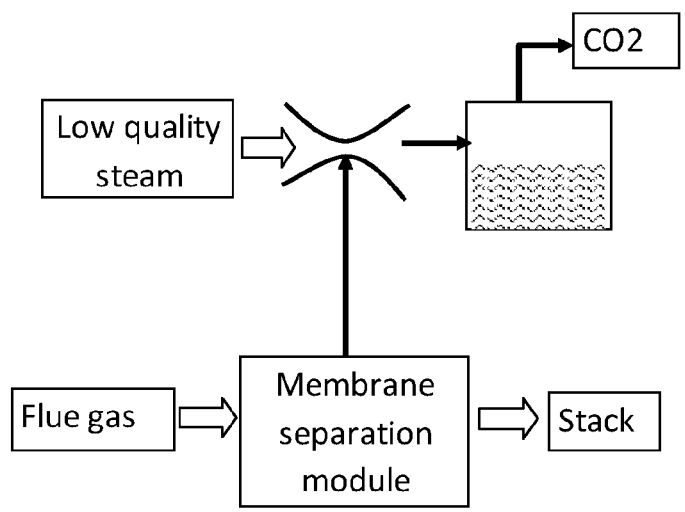
FIG. 19

(a) USE OF MEMBRANE AS A ENRICHMENT UNIT (b) USE OF MEMBRANE AS A PRIMARY SEPARATION UNIT

CATALYZED $CO_2$-TRANSPORT MEMBRANE ON HIGH SURFACE AREA INORGANIC SUPPORT

CROSS REFERENCE TO RELATED APPLICATIONS

This application is a continuation-in-part of, and claims priority to, U.S. patent application Ser. No. 12/470,294, filed on May 21, 2009, and claims the benefit of U.S. Provisional Patent Application No. 61/259,861, filed Nov. 10, 2009, which are both hereby incorporated by reference in their entireties.

ACKNOWLEDGMENT OF GOVERNMENT SUPPORT

This invention was made with Government support under Contract DE-AC06-76RLO1830 awarded by U.S. Department of Energy. The Government has certain rights in the invention.

TECHNICAL FIELD

This application discloses immobilized liquid fluid membranes and methods of making the same, and particularly discloses immobilized liquid fluid membranes including modified, porous metallic substrates for carbon dioxide separation.

BACKGROUND

Membrane separation is intrinsically energy efficient. Almost all separation processes in living biological systems are performed through a membrane. At present, there exist grand challenges in both membrane materials and design for effective gas separation, particularly for $CO_2$ separation and more particularly for $CO_2$ separation from flue gas stream mixtures. Due to the low partial pressure of $CO_2$ in flue gas mixtures, and the huge gas volumes, a great quantity of membrane surface area is typically needed for the separation process. While certain $CO_2/N_2$ selectivity is necessary, high permeance is an important factor for reduction of membrane surface area, module volume, and cost for making such separation devices on a commercial scale.

Polymeric membranes based on glassy polymers such as cellulose acetate, polyimide, and poly(phenylene oxide) (PPO) are commercially available products for separation of $CO_2/N_2$ and $CO_2/CH_4$ pairs. However, such polymers show decreased performance in presence of water vapor due to competitive sorption between water and permeate gases. These commercially available membranes also have low $CO_2$ permeance under flue gas conditions.

Poly(vinyl alcohol) (PVA) membranes and other polymeric membranes have been tried. However, PVA-based membranes require separation temperatures above 100° C., which is well above flue gas temperatures. Certain thin PVAm/PPO composite membranes (molecular polyvinylamine coated with poly(phenylene oxide)) have been alleged to operate at 25 to 40° C.—within the flue gas temperature range. However, these membranes require a presence of a large fraction of moisture in the feed gas and/or sweep gas to keep the separation membrane layer wetted or swollen. As water permeance is much higher than $CO_2$, a large volume of water must be introduced into the feed gas to keep the membrane fully wetted. For a given PVAm/PPO membrane, the $CO_2$ permeance decreases by nearly three orders of magnitude as the feed gas relative humidity (RH) was reduced from 90% to about 25%.

A few inorganic membranes have been investigated for use as $CO_2$ separators. It has been reported that molecules can be separated over a silicalite membrane based on differences in molecular weight as well as size or shape. The ZSM-5 (zeolite sieve of molecular porosity—5) type zeolite membranes shows only moderate $CO_2/N_2$ or $CO_2/He$ selectivity at low $CO_2$ feed pressures, which falls short of the flue gas separation needed ($CO_2/N_2$ selectivity greater than 50).

What is needed are membranes and methods for making the same, which membranes provide improved stability, high $CO_2$ permeation flux, and cost-effective manufacturability for commercial-scale use for separating $CO_2$ from gas streams such as flue gases.

SUMMARY

Presently disclosed are carbon dioxide separation membranes, membrane modules for industrial-scale use, and methods of making the same, which new membranes provide superior stability, $CO_2$ permeation and are cost-effective to make and use on a commercial scale for effectively separating $CO_2$ from gas streams such as flue gas streams. High $CO_2$ permeation flux is achieved by immobilizing an ultra-thin, preferably catalyzed fluid layer (typically less than 60 μm thick) onto a macro-porous inorganic substrate, which in turn has been modified with a micro-porous or meso-porous modification layer, such as a metal oxide or a ceramic modification layer. The $CO_2$-selective liquid fluid is immobilized within the pores of the modification layer or within the pores of the support to block any gas transport pathways that are not selective toward $CO_2$ permeation over the other molecules, such as gas-phase diffusion and viscous flow. The membrane structure immobilized by a liquid fluid leaves the transport through the liquid fluid as the dominating mechanism for $CO_2$ molecules to move from the feed side of the membrane to the permeate side of the membrane under a driving force of chemical potential gradient such as partial pressure differential of $CO_2$. The immobilized liquid fluid selectively absorbs $CO_2$ from feed gas mixtures such as flue gas mixtures, allows fast diffusion of the dissolved (or reacted) $CO_2$ species across the thickness of the liquid fluid, and desorbs $CO_2$ in the permeate side.

Embodiments of the disclosed membranes have $CO_2$ permeance levels of $1.0 \times 10^{-7}$ mol/(m²sPa) or better. The present membranes provide a cost savings for manufacturing for commercial scale use of up to or exceeding 60% as compared to the conventional separation devices.

Embodiments of the disclosed membranes may comprise a porous, thin-metallic substrate or support sheet, a porous metal oxide or ceramic modification layer on the metal substrate and a $CO_2$-selective liquid fluid being incorporated into the formed inorganic substrate. The thin-metal substrate supported membranes provide superior mechanical strength, chemical stability, and high surface area packing density to the immobilized liquid membranes. The metal substrate's surface is modified to change the pore size from macro-porous to micro-porous (less than 1 nm) or meso-porous (a few nms) via a modification layer such as a metal oxide or ceramic modification layer formed thereon. The porous metal substrate, modification layer (modifying the pores of the substrate to provide uniform pore structure for the immobilized $CO_2$-selective liquid fluid), and the $CO_2$-selective liquid all act together to provide high $CO_2$ gas permeance and selectivity, while allowing for a low-cost membrane (both in construction and operation cost).

Diffusion flux across a membrane is increased by the presently disclosed membranes as the membrane thickness is relatively thin as compared to conventionally available membranes for $CO_2$ separation on a commercial- or industrial-use scale. The disclosed metal-supported membranes can be manufactured using a roll-to-roll production process offering yet further competitive manufacturing costs, especially as compared to planar polymeric membrane modules that are currently used in large-scale industrial applications such as waste-water treatment plants.

Certain embodiments of the disclosed membranes include liquid fluids comprising ultra-thin, catalyzed liquid fluids. Certain embodiments further include particular catalyst additives that are either soluble or solid, which enhance $CO_2$ reaction (or adsorption) kinetics with the liquid-phase carrier so that $CO_2$ absorption and/or desorption are not rate-limiting steps to high permeance of the separation membrane. Certain embodiments of the disclosed membranes include liquid fluids comprising $CO_2$-selective ionic liquids immobilized on the porous modification layer of the metal substrate such that an ultra-thin (e.g., less than 2 μm thick or 5 μm) and stable immobilized liquid membrane is obtained. In certain embodiments the ionic liquid is catalyzed. In certain embodiments the porous metallic substrate or the modification layer itself can also act as a catalyst to enhance $CO_2$ reaction kinetics. Lastly, the modification layer also acts to prolong the effective life of the membrane by guarding the substrate against erosion, swelling, and/or penetration.

Also disclosed are methods for using the disclosed membranes providing superior $CO_2$ separation performance under typical flue gas conditions ($CO_2$, $N_2$, $O_2$, $H_2O$, $SO_2$, and NO mixtures) at 20 to 80° C. but being operable in broader temperature ranges, such as between operating temperatures between −50 to 300° C. Further disclosed are methods for manufacturing the membranes including manufacturing of the porous metal substrate, membrane modification layers, and membrane fabrication processes.

In one embodiment the disclosed separation apparatus comprises a membrane having a first side and a second side, the membrane capable of selective permeation of carbon dioxide from the first side to the second side of the membrane, the separation driven by a chemical potential gradient of carbon dioxide, the membrane including a macro-porous metallic substrate having a plurality of pores having a mean pore size of micrometers or sub-micrometer size and a porosity of from 35% to 70%, a micro-porous and/or meso-porous modification layer modifying pore openings and/or modifying a surface chemistry on the first side of the porous metallic substrate, a liquid fluid immobilized within pores of the modified metallic substrate, and the liquid fluid is capable of allowing carbon dioxide molecules to (i) selectively absorb relative to other types of molecules, (ii) be mobile in the liquid fluid, and (iii) desorb from the liquid fluid into a gas phase on the second side of the membrane.

In one embodiment of the disclosed processes, the separation process comprises providing a membrane having a first side and a second side, and selectively permeating and separating carbon dioxide from the first side to the second side of the membrane, the separation driven by a chemical potential gradient of carbon dioxide, forming the membrane by providing a macro-porous metallic substrate having a plurality of pores having a mean pore size of micrometers or sub-micrometer size and a porosity of from 35% to 70%, providing a micro-porous and/or meso-porous modification layer modifying pore openings and/or modifying a surface chemistry on the first side of the porous metallic substrate, providing a liquid fluid immobilized within pores of the modified metallic substrate and allowing carbon dioxide molecules to (i) selectively absorb in the liquid fluid relative to other types of molecules, (ii) be mobile in the liquid fluid, and (iii) desorb from the liquid fluid into a gas phase on the second side of the membrane. In certain embodiments the liquid fluid is an amine-based or carbonate-based solution. In some embodiments the liquid fluid is stable under operating temperatures between −50 to 300° C. In other embodiments the liquid fluid comprises an amino acid salt solution or an ionic liquid.

In certain embodiments the chemical potential gradient of $CO_2$ is a partial pressure differential of $CO_2$. In another embodiment the $CO_2$ is separated from a feed gas mixture when the membrane is subjected to a gas pressure of 1 bar or greater on the first side of the membrane and a gas pressure less than 1 bar on the second side of the membrane by the feed gas mixture.

The foregoing and other objects, features, and advantages of the invention will become more apparent from the following detailed description, which proceeds with reference to the accompanying figures.

BRIEF DESCRIPTION OF THE DRAWINGS

FIG. 1a illustrates an embodiment of the disclosed $CO_2$-selective liquid membrane; FIGS. 1b and 1c illustrate the morphology and micro-structures of porous metallic substrates of certain embodiments of the disclosed membranes.

FIGS. 4a and 4b illustrate embodiments of the disclosed immobilized ionic liquid membranes (shown in FIG. 4b) as compared to a solute-diffusion model (shown in FIG. 4a).

FIGS. 5a-5d illustrate various embodiments of the disclosed catalytic membranes for immobilization of $CO_2$-selective fluids inside metal or metal oxide pores.

FIGS. 6a and 6b illustrate absorption/desorption kinetics for certain embodiments of an ionic liquid/catalyst combination in a flow reactor.

FIG. 7 is a flow chart illustrating an embodiment of a fabrication process for making the disclosed porous metal sheets.

FIGS. 13a and 13b illustrate gas permeance and yield strength measurement results of embodiments of porous Ni substrates.

FIG. 14 are permeability test results for a thin metal oxide modification layer/porous metallic substrate as measured at room temperature with both dry and wet $CO_2$ gas mixture.

FIGS. 18a and 18b illustrate certain embodiments of the disclosed immobilized liquid membrane separation modules.

FIG. 19 illustrates a $CO_2$ capture process using certain embodiments of the disclosed immobilized liquid membrane.

DETAILED DESCRIPTION

Figure 2A:
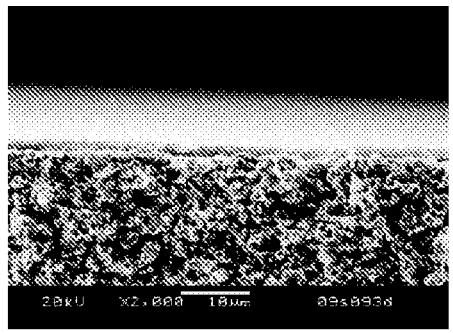
FIGS. 2a and 2b are photographic images of certain embodiments of the disclosed micro- and meso-porous metal oxide modification layers on embodiments of the porous metallic substrates.

Disclosed are new immobilized liquid inorganic substrate membranes, membrane modules, methods of preparation, and applications for $CO_2$ separation. In general, a liquid fluid of selective $CO_2$ absorption properties is immobilized in a thin (from 20 to 200 μm), macro-porous metallic substrate (mean pore size from 0.2 to 2 μm) having a meso-porous or micro-porous modification layer thereon and providing a permanent structure to keep the $CO_2$-selective fluid intact under $CO_2$ separation process conditions. Carbon dioxide selectively absorbs into the liquid fluid on the feed side, the absorbed specie diffuses across the liquid fluid under a partial pressure gradient of $CO_2$, and $CO_2$ desorbs on the permeate side. The porous metallic substrate provides mechanical strength and enables a membrane module package of relatively high membrane surface area per unit packing volume. Embodiments of the presently disclosed invention allow $CO_2$ to continuously absorb and desorb in the same location during membrane separation so that the heat of absorption is compensated by the heat of desorption. The membrane separation is thus conducted under nearly constant temperature. Thus, energy and capital costs associated with regeneration required for conventional absorption apparatus and processes are greatly reduced. Compared to conventional membranes, the disclosed membranes provide combined performance attributes of high membrane area packing density, low cost, and durability, with a very high $CO_2$ permeance.

Embodiments of the present invention provide a solution to the $CO_2$ separation problem in at least one or more of the following aspects: rugged membrane materials stable under flue gas conditions ($CO_2$, $O_2$, $N_2$, $H_2O$, $SO_x$, $NO_x$, trace amounts of hydrocarbons); highly permeable membrane to manage low $P_{CO2}$ in flue gas; and/or high surface area packing density feasible for scale-up to large-scale flue gas capture applications.

At present there are great challenges in developing both membrane materials and designing the membranes and membrane systems or modules for $CO_2$ separation, due to the low partial pressure of $CO_2$ in waste streams such as flue gas and due to the large membrane surface area necessary for the flue gas and other such applications. While certain $CO_2/N_2$ selectivity is necessary, high permeance is an important factor for reducing surface area, volume and cost.

TABLE 1

Estimate of membrane surface required for flue gas $CO_2$ capture

| | | | | |
|---|---|---|---|---|
| Coal combustion capacity, M T/Y | 1.0 | 1.9 | 1.0 | 1.9 |
| Power output, MW | 250 | 500 | 250 | 500 |
| ΔP of $CO_2$ partial pressure, bar | 0.079 | 0.079 | 0.079 | 0.079 |
| Permeance, mol/m$^2$/s/Pa | $1.0^{-7}$ | $1.0^{-7}$ | $1.0^{-6}$ | $1.0^{-6}$ |
| Membrane area required, m$^2$ | 2,671,503 | 4,942,281 | 267,150 | 494,228 |
| Membrane packing density, m$^2$/m$^3$ | 1,000 | 1,000 | 1,000 | 1,000 |
| Membrane module volume, m$^3$ | 2,672 | 4,942 | 267 | 494 |

As used herein, "comprising" means "including" and the singular forms "a" or an or "the" include plural references unless the context clearly dictates otherwise. The term or refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

To facilitate review of the various embodiments of the disclosure, the following explanations of specific terms are provided:

Immobilized Liquid Fluid: A liquid fluid that is bound to a surface of solid matter, such as bound to the surface of a pore of a host matrix. The liquid can be bound onto the solid surface by chemical bonding formation between the host matter and the liquid, van der walls forces, and/or capillary forces, depending upon the thickness of the liquid to be immobilized.

Immobilized Liquid Membrane: A membrane that includes a liquid solution immobilized in the pores of s host matrix, such as the membrane support, by physical and/or chemical forces.

Membrane substrate or support: The membrane substrate or support is a structure having a surface for depositing a modification layer of a selective membrane. The membrane substrate is permeable so that a molecule separated by the membrane can readily permeate through the membrane substrate. The membrane substrate provides mechanical integrity for the membrane. In certain embodiments the membrane substrate is a porous metallic support.

Permeance or permeation: The degree to which a material admits a flow of matter or transmits another substance. Permeable materials are those through which gases or liquids may pass. Membranes are one type of permeable material and are composed of thin sheets of natural or synthetic material. Frequently, membranes exhibit different permeances, e.g., permeation rates—for different chemical species. In this regard, permselectivity is the preferred permeation of one chemical species through a membrane with respect to another chemical species. Permselectivity of the desired permeate with respect to another chemical species is calculated as the ratio of the permeance of the desired permeate to the permeance of the other chemical species.

Permanent Support Structure: The modified porous metallic substrate having a micro-porous and/or meso-porous modification layer modifying pore openings and/or modifying a surface chemistry on a surface of the porous metallic substrate to form a permanent support structure such that the metallic substrate as modified is not significantly affected by the immobilized liquid and/or separation conditions.

Porous: A term used to describe a matrix or material that is permeable to fluids. For example, a porous matrix is a matrix that is permeated by an interconnected network of pores (voids) that may be filled with a fluid (such as a liquid or gas). In some examples, both the membrane support and the membrane modification layer have continuous pores so as to form two interpenetrating continua.

Selective Permeation: A process that allows only certain types of molecules or ions to pass through a material, such as a membrane. In some examples, the rate of passage depends on the pressure, concentration, and temperature of the molecules or solutes on either side of the membrane, as well as the permeability of the membrane to each solute. Depending on the membrane and the solute, permeability may depend on solute size, solubility, or other chemical properties. The presently disclosed membranes are selectively permeable to $CO_2$ as compared to other gases typically encountered in flue gas mixtures.

Figure 2B:
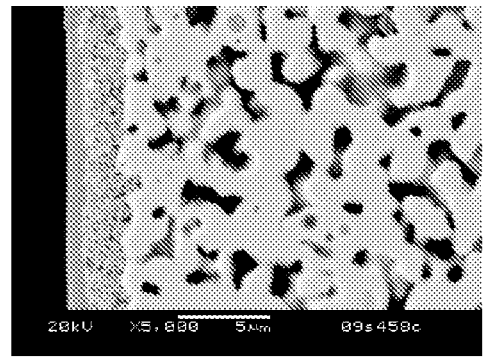

In general, embodiments of the disclosed membranes 10 comprise a macro-porous (i.e., a pore size of greater than 50 nm), inorganic substrate such as a thin-metal substrate 14, a modification layer 18 on one side of the metal substrate and a $CO_2$-selective liquid fluid 20 formed within the pores of the modification layer 18 (FIG. 1a) or within the pores of the porous metal substrate 14. The modification layer acts to modify the surface chemistry and/or the pore structure of the substrate to provide a micro-porous (less than 2 nm) or meso-porous (between 2 and 50 nm) surface having a substantially uniform pore structure. FIGS. 2a and 2b show embodiments of the porous membrane substrate. The morphology and structure of the bare inorganic, preferably metallic substrate are illustrated in FIGS. 1b and 1c. The bare substrate provides a mechanical backbone for the membrane device. In the embodiment shown in FIG. 2b, a meso-porous ceramic modification layer is formed on the substrate, while the embodiment shown in FIG. 2a includes a micro-porous modification layer such as molecular sieve membrane on the substrate. The metallic substrate provides combined attributes of chemical and thermal stability, high porosity, is thin, has mechanical strength, and may be chosen to provide catalytic functions as well.

In certain embodiments the porous metallic substrate is modified by the modification layer such that it forms a permanent support structure. That is, the modified porous metallic substrate has a micro-porous and/or meso-porous modification layer modifying pore openings and/or modifying a surface chemistry on a surface of the porous metallic substrate to form a permanent support structure such that the metallic substrate as modified is not significantly affected by the immobilized liquid and/or separation conditions.

In certain embodiments of the disclosed membranes the liquid fluids comprise ultra-thin, catalyzed liquid fluids. Other embodiments of the disclosed membranes include liquid fluids immobilized on modified porous substrates that act as catalysts.

In general, operation of the disclosed membranes is illustrated in FIGS. 5a-d. The $CO_2$-selective fluid can be immobilized inside the pores of modification layer that is in turn supported on a porous metal substrate (or sheet) (FIGS. 5a and 5b). The $CO_2$-selective liquid fluid can also be immobilized inside pores of the metallic substrate (FIGS. 5c and 5d), while the other side of the substrate is coated with a barrier layer that allows gas molecules through but prevents the liquid fluid from penetration.

Embodiments of the disclosed membranes include relatively thin, porous substrates as the membrane support; the support determines surface area, packing density, membrane module fabrication, and subsequent membrane processing. Conventional inorganic membrane tubes (about 6 mm to 30 mm in diameter) are associated with low surface area packing density and high costs. The currently available polymeric sheets and hollow fibers fall short of the required chemical stability, mechanical strength, and gas permeability necessary for $CO_2$ separation from flue gas streams. Low thermal stability of the polymeric support limits its membrane processing temperature. For example, highly permeable and stable metal oxides could not be coated on the polymeric support.

The thin, porous metal substrates disclosed herein provide a unique combination of performance attributes, including high surface area packing density, chemical stability, thermal stability, mechanical strength, high $CO_2$ permeability, and can be manufactured on a commercial scale at relatively low cost. These attributes are not obtained with conventional ceramic or polymeric substrates.

The thin, porous substrates disclosed herein preferably comprise porous substrates formed of one or more durable inorganic materials such as nickel, titanium, aluminum alloy, nickel alloy, iron alloy, and stainless steel.

As illustrated in FIGS. 1b and 1c, such a porous metal substrates have the appearance of a metal foil but comprise uniform, networked pore structures throughput the substrate body. Since the substrate is very thin, such as from 10 to 200 µm, or from 10 to 100 µm or from 10 to 50 µm, a large surface area can be packed per unit volume. Certain embodiments of the disclosed metallic substrates have thicknesses less than 200 µm, or less than 100 µm, preferably closer to 50 µm or 30 µm or less. Conventional membranes, such as commercial ceramic or metallic substrates (such as ceramic plates and discs, metal sinters and discs, and metal foams) were typically a few millimeters to a few hundred microns thick and often comprise large mean pore sizes (from tens of microns to a few hundred microns) of a rough pore structure that was not uniform. As such, use of such prior art substrates is not desirable for preparation of high-performance liquid immobilized membranes.

The substrate thickness, mean pore size, and porosity are all controllable parameters and can be adjusted over a range to meet specific application requirements. The metal composition and crystal phase can be controlled by adjusting batch composition of the starting raw materials and subsequent thermo-chemical reaction treatment conditions (such as temperature and gas environment) by procedures known to those of ordinary skill in the art, and can also be designed to meet the mechanical strength and chemical stability requirements for use on an industrial scale under such conditions.

The substrate generally has an average pore size of a few microns, such as 1 µm or 0.5 µm. The pore size uniformity of the substrate, whether modified or not, has uniform porosity as well so as to provide a uniform, thin modification layer as well as a uniform liquid membrane.

From a permeability point of view, higher porosity is desirable since the amount of liquid to be hosted increases with the porosity and pores tend to be more likely connected to each other at high porosity. However, the mechanical strength and integrity of the membrane may decrease with too high of a porosity of the substrate. Therefore, preferred substrate porosity is 25% to 70%, such as 30% to 60%.

Porosity may be measured by any means known to those of ordinary skill in the art. In one example, porosity is measured using the Archimedes method. For example, the material is weighed dry, and then submerged in a liquid. A vacuum is applied to remove air from the pores and then the sample is weighed submerged in the same fluid used to fill the porosity, and finally the mass of the sample is measured saturated with the fluid (excess removed from surfaces, but not pulled out of voids in the sample). The porosity can then be calculated by the following formula:

$$\text{Porosity} = \frac{\text{Saturated Mass} - \text{Dry Mass}}{\text{Saturated Mass} - \text{Submersed Mass}}$$

In some embodiments, a portion of the pores are isolated and do not connect with other pores within the matrix. However, a sufficient number of pores need to be connected in order to facilitate efficient permeation. Connectivity of the pore can be effectively characterized by the porosity. A sufficient number of pores will be connected to each other when the porosity is above a certain level, such as at least greater than 25%.

In certain embodiments membranes include porous Ni alloy thin substrates (50 µm) with resulting superior gas permeability, mechanical strength and flexibility, and stability. As can be seen in FIG. 13b, in one particular embodiment the yield strength of two porous Ni substrates prepared is compared to a dense Ni alloy 201 foil of the same thickness. The presently disclosed Ni substrate embodiment with 35% porosity has much higher yield strength than commercially available, dense Ni alloy, and thus, the disclosed substrate has good mechanical strength. X-ray diffraction measurements confirm that the metallic Ni is the only identifiable crystal phase among these three samples. The testing method was derived from ASTM E 345 "Standard Test Methods of Tension Testing of Metallic Foil." The porous Ni sheet #1 shows average yield strength about four times of the porous sheet #2. The yield strength of the porous sheet #1 is about 60% and 140% higher than that of the dense Ni foil based on the geometry and solid, respectively.

The high porosity increases the gas permeance but reduces connectivity of the metal grains and strength of the metal sheet. With the porous substrate at 35% porosity, the gas permeance is $2.4^{-4}$ mol/m2/Pa/s and far exceeds the target membrane permeance of $1 \times 10^{-6}$ mol/m2/Pa/s. Thus, the highly permeable porous metal substrate can be prepared with mechanical yield strength greater than the dense metal foil of the same family material. As shown in FIG. 13a, the porous metal substrate is very flexible. Its pore structure is also stable under 120 psi compression pressure even at high temperatures (e.g., 800° C.). By comparison, porous ceramic plates and conventional metal foams are easily broken upon bending, and the polymeric sheets at such thickness do not self-stand and the pore structure is readily deformed by stretching and/or compression.

Figure 12:
FIG. 12 illustrates a possible embodiment for making the disclosed porous metallic substrates.
Figure 15A:
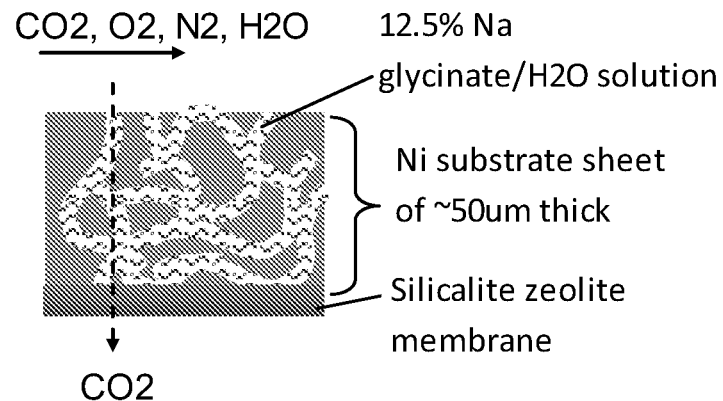
FIGS. 15a and 15b illustrate test results for $CO_2$ permeance and $CO_2/N_2$ selectivity of an embodiment of the disclosed immobilized liquid membrane with embodiments of the disclosed support materials at differing relative humidity.
Figure 15B:
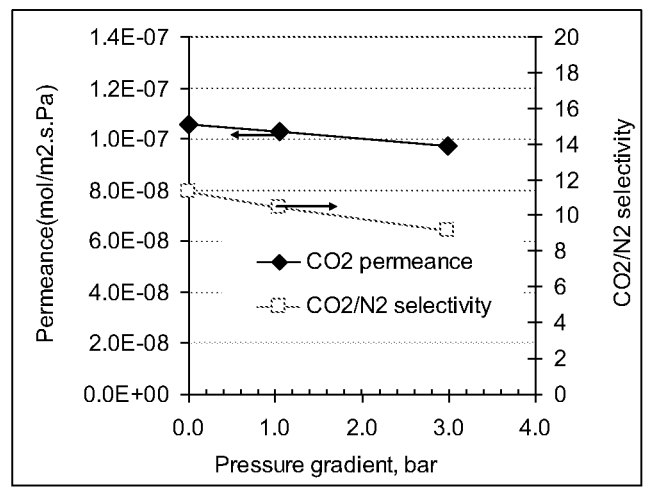
Figure 15C:
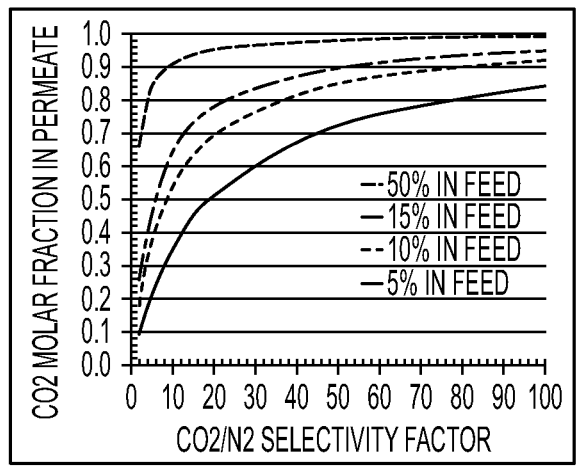
FIGS. 15c and 15d show results of impacts of $CO_2/N_2$ selectivity on $CO_2$ content and volume reduction of the permeate at different feed $CO_2$ levels.
Figure 15D:
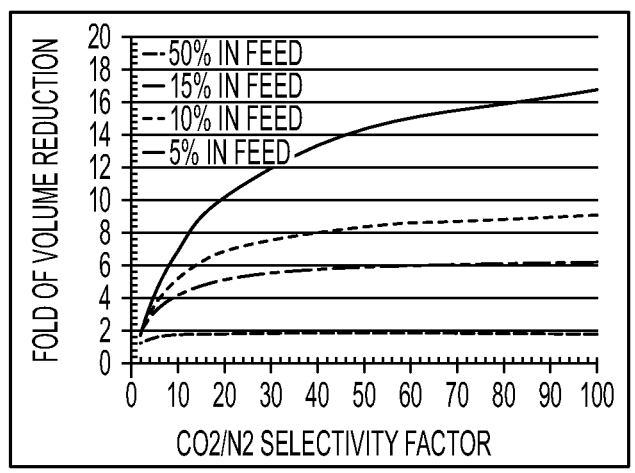

The porous metallic substrate can be made using, for example, the fabrication process as outlined in FIG. 7, beginning with metal precursor materials such as metal oxides that can be acquired from commercial sources at bulk quantities and low prices. Precursors may be, for example, nickel oxide, copper oxide, iron oxide, and the like. The metal precursors are mixed with pore formers, such as carbon black and/or graphite particles and other additives such as dispersing agents and binders, to form a substantially homogenous slurry. The slurry is casted into sheets of the desired thickness, e.g., 50 µm to form a green sheet or body (see FIG. 12). The green body is dried at low temperatures, typically less than 200° C., to generate some pores inside the body, which allow gas inside the body to diffuse. The metal precursor(s) is then converted into a metallic state or alloy using a high-temperature reduction process such as from 300° C. to 1200° C. in a $CO_2$ or $H_2$-containing gas environment.

Resulting metal crystal size and sintering can be controlled by the reaction conditions. The crystal size growth rate exponentially increases with sintering temperature increase. These process steps result in a metallic substrate having substantially uniform pore size at the macro-porous level. The porous metallic substrate may be subsequently annealed under suitable gas environment and conditions to produce the desired crystal phase and composition. The porous metallic substrate can be further modified by post treatment, as needed. For example, the metallic surface can be made hydrophobic by exposing the porous metal sheet to PDMS or silane gas environments at temperatures above 200° C.

The porous modification layer material may comprise TiO2, silica, ceria, γ-alumina, meso-porous solids impregnated with Ni, Fe, Ru, Cu, CuNi, Cu, Zn, Au, Pd, and mixtures. In some embodiments the modification layer comprises silicalite and ZSM-5 zeolite. In other embodiments the porous substrate includes a thin modification layer such as a highly-permeable metal oxide modification layer of a few nanometers or less pore size. The macro-porous substrates have pore sizes that are too large for liquid immobilization for the proposed $CO_2$ separation processes. The porous substrate modification layer reduces the membranes' pore sizes to provide a micro- or meso-porous surface. The porous substrate modification layer has a thickness of less than or equal to 20 µm, preferably less than 5 µm. The pore size of the utmost surface of the modification layer is from 0.3 to 200 nm, preferably 0.4 to 20 nm. In certain embodiments the membrane includes a micro-porous modification layer having a mean pore size between 0.3 nm to 2 nm. Other embodiments include a meso-porous modification layer having a mean pore size between 2 nm to 50 nm.

In certain embodiments a metal oxide porous substrate modification layer of uniform pore structures is deposited on the porous metallic substrate modifying the chemistry of the surface of the porous metallic substrate and modifying the mean pore size to be less than or equal to 2 nm. The small pore size provides large capillary force for trapping of the separating liquids and reduces liquid-phase molecule diffusion distance. The bare substrate pore size at macro-porous level is larger than what is preferred for immobilization of the liquid fluid. Accordingly, the metallic substrate may be modified with micro-porous or meso-porous modification layers, such as ceramic modification layers, to have high gas permeance and BET surface. As seen in FIG. 2a, a micro-porous silicalite (zeolite) layer has been grown directly on the substrate by hydrothermal growth at a thickness of less than 2 μm. The pore size of this type of zeolite membrane coating layer is 0.53 nm to 0.58 nm. Meso-porous metal oxide modification layers with pore sizes of a few nanometers may be coated on the porous metal substrate (FIG. 2b).

Figure 3A:
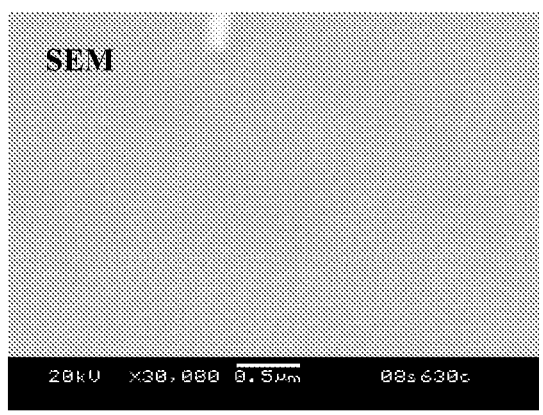
FIGS. 3a and 3b are SEM and TEM images illustrating surface texture and pore structure of certain embodiments of the disclosed meso-silica coated porous metallic substrates.
Figure 3B:
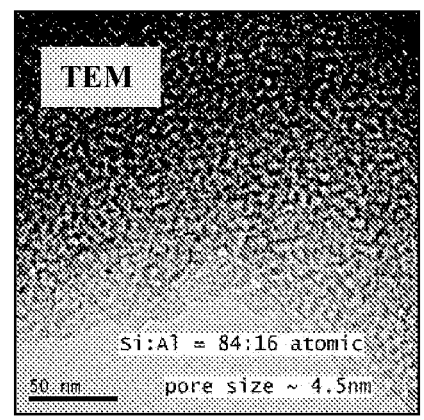

By providing multiple layers of coatings and adjusting pore structures of pre-coats (i.e., the first or second coat) on the metallic substrate, the meso-porous or micro-porous oxide modification layer thickness is controllable over a range from 100 nm to 2 μm or less. The modification layer provides a uniform pore size by use of the coating precursor materials of uniform pore sizes, controlling the coating process conditions, and using a substrate of uniform pore sizes. Modification layers of micro- or meso-porous ceria, $TiO_2$, zirconia, and silica have been prepared. The structures of meso-porous silica modification layers have been confirmed by SEM and TEM (see FIGS. 3a and 3b, respectively), which show uniform pore structures. The membrane preparation is performed to provide a narrow pore size distribution of uniform pore size. Because there is pressure gradient across the membrane during a gas separation process the uniformity is preferred. If the pore sizes are not uniform, the immobilized liquid may leak through the large pores while the liquid in the smaller pores remains intact. Molecular separation is then poor due to such leakage.

The modification layer formed on the porous metallic substrate may affect the surface chemistry of the metallic substrate such that the metallic substrate as modified is not significantly affected by the immobilized liquid and/or separation conditions thereby forming a permanent support structure for the separation membrane.

Figure 8:
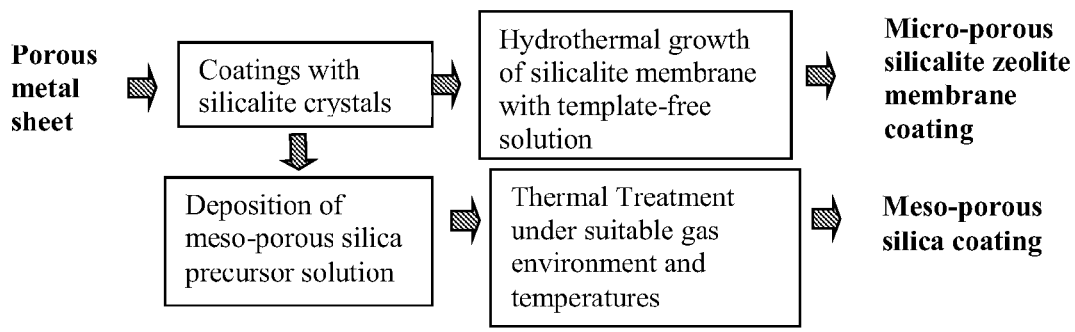
FIG. 8 is a flow chart illustrating an embodiment of the disclosed process for deposition of micro-porous and meso-porous silica modification layers on the disclosed porous metallic substrates.

Two possible methods for preparing certain embodiments of the meso-porous and micro-porous silica membrane modification layers are outlined in FIG. 8. First, the porous metallic substrate may be coated with silicalite crystals at a controllable mean crystal size from 50 nm to 800 nm. Control of the crystal size allows formation of superior seed coating (the pre-coating) layer on the metal substrate. The crystal size directly affects the opening of the void spaces in the coating layer, that is, pore sizes. The larger the crystal size, the larger the pore size. The crystal size may be controlled by adjusting its growth solution compositions, temperature and time periods by methods known to persons of ordinary skill in the art. The first layer of silicalite serves as a seed layer for growth of a silicalite zeolite modification layer. The seed layer allows the silicalite modification layer of uniform pore structures, and a layer that is substantially free of defects. During the hydrothermal reaction, the seed coating enables inter-crystal growth to seal any gap (or voids) and form a continuous polycrystalline silicalite membrane with uniform pore size of, e.g., 0.55 nm. A highly permeable silicalite zeolite modification layer can be grown, e.g., using a template-free growth solution at temperatures from 100 to 180° C., within a few hours. The template free solution can be prepared by mixing sodium hydroxide, fumed silica and water by stirring. With the template-free growth solution, the resulting membrane can be used by simply washing and drying—no high-temperature calcination is needed. Silicalite zeolite meso-porous or micro-porous modification layers have superior thermal, hydrothermal, and chemical stability, making it an ideal material for a modification layer or a pre-modification layer.

The highly-permeable meso-porous silica modification layer can be prepared on the porous metal substrate that is precoated with the silicalite seed crystal. A precursor solution may comprise non-ionic surfactants (Brij 76), polyoxyethylene 10 stearyl ether (C18EO10), pluronic F-127, HCl, and tetraethyl orthosilicate (TEOS) in ethanol/water solution. A layer of the precursor solution is deposited on the pre-modification layer of the metal substrate. Then, the metallic substrate is placed inside a furnace and treated under suitable gas environment and temperatures for a certain time, such as 5° C./min to 350° C., 0.5-h hold at 350° C. in flowing air. The thermal treatment process vaporizes the precursor, promotes formation of an ordered meso-porous silica structure and removes volatile organic molecules by desorption and oxidation.

Figure 9:
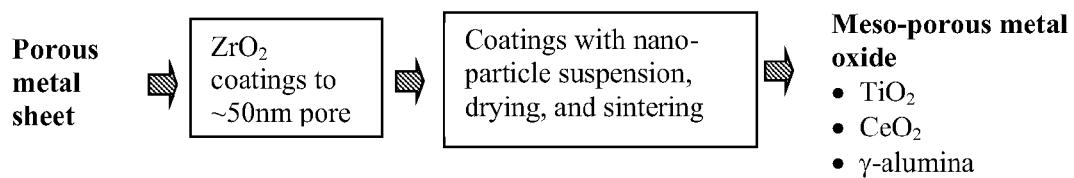
FIG. 9 is a flow chart illustrating an embodiment of the disclosed process for deposition of meso-porous metal oxide modification layers on the disclosed porous metallic substrates.

The uniform pore structure of the meso-porous silica modification layer is an ordered pore structure, while conventional porous silica material comprises irregular pore structures made of random packing of silica crystalline or amorphous silica particles. In addition to the meso-porous silica modification layer, a few other micro- or meso-porous oxides, including $TiO_2$, $CeO_2$, and γ-alumina, may be prepared, such as by the process outlined in FIG. 9. $TiO_2$ itself may be catalytically active for $CO_2$ absorption and association with ionic liquids. Sintering of the modification layer is preferably performed without using a very high-temperature process (e.g., less than 800° C.), particularly for the pre-modification layer of large metal oxide crystal sizes. Typically, a higher temperature (e.g. at least 400° C.) is needed to sinter the larger sizes of crystals, while sintering of metal oxide coating forms a bonded coating layer. Without sintering the coating layer may comprise loose metal oxide particles. If the sintering temperature employed for the modification coating is too high (e.g., greater than 600° C.), undesirable sintering and/or oxidation of the porous metal substrate may occur.

Liquid fluids suitable for the membrane immobilization and selective permeance of $CO_2$ using the disclosed membranes, preferably have low volatility (e.g. vapor pressure of less than 2 kPa under separation conditions), are selective for $CO_2$ absorption/reaction over other molecules, and are stable under flue gas conditions. The low or non-volatility maintains the immobilized fluid inside the membrane support structure during long process operation (e.g., a few years). Selective $CO_2$ absorption/adsorption allows the $CO_2$ separation. The selective fluid is preferably one that does not degrade over time and does not react with molecules in the flue gas to form other compounds or phases such that the membrane does not function as a $CO_2$-selective membrane (See Table 1). Other preferred properties of a selective fluid are high diffusion rate (as relative to the solid-state diffusion, 10-15 $m^2/s$) of the $CO_2$-containing species in the fluid, relatively low cost, and non-toxicity. The liquid fluid may comprise alkaline amino acid salt solution (such as sodium glycinate, potassium glycinate, and/or cesium glycinate), polyamine solutions, and ionic liquids. A class of useful ionic liquids may include ammonium-based ionic liquid monomers and their corresponding polymers (poly-ionic liquids, such as 1-(4-vinylbenzyl)-3-butylimidazolium tetrafluoroborate (VBIT), 1-(4-vinylbenzyl)-3-butylimidazolium hexafluorophosphate (VBIH), 2-(1-Butylimidazolium-3-yl)-ethyl methacrylate tetrafluoroborate (BIMT), and tetraalkylammonium ionic liquids consisting of [2-(methacryloyloxy)ethyl]dimethylheptyl ammonium as cation and an anion selected from bis(trifluoromethylsulfonyl)imide, nonafluoro-1-butanesulfonate, dodecylbenzenesulfonate, heptadecafluorooctanesulfonate, or heptadecafluoroundecanoate anions. Another preferred series of ionic liquids is based on phosphonium-amino acids, such as tetrabutylphosphonium amino acids.

Figure 16:
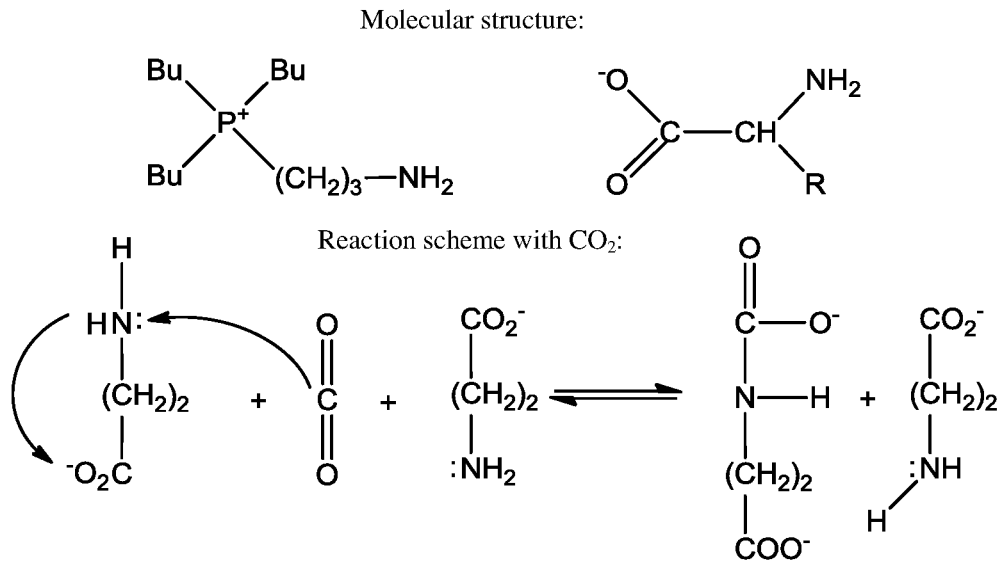
FIG. 16 is a reaction scheme for a phosphonium-amino acid ionic liquid.

A number of ionic liquids can be derived from using different amino acids as anions. One feature of these ionic liquids is that in absence of $H_2O$, $CO_2$ molecule reacts with the —NH-functional groups of the ionic liquid molecule in 1:1 molar ratio, as shown by the reaction scheme in FIG. 16. In the presence of $H_2O$, the new ionic liquid can react with $CO_2$ in a mechanism that is, the same as the amine in a molar ratio of $CO_2$/IL of 1:2. Such dual reaction paths are useful for separations where there is significant moisture content in the flue gas.

The liquid fluids preferably form a thin film on the porous metallic substrate at a thickness of 100 nm to 100 μm or 500 nm to 50 or 500 nm to 5 μm. In some embodiments the liquid fluid is immobilized inside the pores of the substrate or the modification layer and the thickness of the immobilized liquid fluid is less than 10 μm or less than 100 μm. The liquid is immobilized in the substrate in such a way that the for a gas molecule to move from the feed side into the permeate side of the membrane, that path is limited to a path through the selective liquid fluid layer.

Certain embodiments of the disclosed membranes include ionic liquid systems such as tailored ionic liquids based on studies of catalysis, membrane immobilization, and separation performance tests (as described below). Due to the unique characteristics of ionic liquids (ILs), alkaline groups such as an amine —$NH_2$ can be attached to the structure of cations or anions while maintaining the merits of the ILs. Properties of ionic liquids are largely determined by choice of anions and cations. The variety of available anions and cations makes the number of potential ionic liquids nearly limitless. Table 2 lists useful properties of a $CO_2$-selective liquid fluids for certain embodiments of the presently disclosed immobilized membranes.

TABLE 2

Desirable performance attributes of ionic liquid for certain of the disclosed membranes Liquid-phase at T < 50° C.
Stable in the presence of moisture and $SO_2$ at 20 to 80° C.
No measurable loss in flowing gas at 80° C.
Absorption/desorption must be reversible TABLE 2-continued Desirable performance attributes of ionic liquid for certain of the disclosed membranes Selectivity of $CO_2$ absorption over $N_2$ and $O_2$ > 100
Diffusivities of solvated $CO_2$, cation, and anion > 1.0E–12 $m^2$/s Certain embodiments include an amino acid/alkaline salt solution as the liquid fluid in the membrane. For longer term applications of the membranes, ionic liquid systems are typically preferable. Certain embodiments of the disclosed membrane include tetrabutylphosphonium amino acid ionic liquids ([P(C4)-4]AA). One important feature about this series of ionic liquid is that in absence of $H_2O$, $CO_2$ molecules react with the —NH-functional groups of the ionic liquid molecules in 1:1 molar ratio, as shown by the reaction scheme in FIG. 16. In the presence of $H_2O$, the ionic liquid can react with $CO_2$ in a mechanism the same as the amine in molar ratio of $CO_2$/IL of 1:2. Such dual reaction paths are useful due to the moisture content in the flue gas. The need of excessive amounts of moisture in the feed gas was a practical disadvantage for the use of conventional polymeric composite membranes containing amine functional groups.

It is shown that $CO_2$ absorption into simply bulk ionic liquid is very slow and insufficient for $CO_2$ separation on an industrial scale. By supporting the ionic liquid on an embodiment of the disclosed modified, porous metallic substrate (such as being modified by a silica modification layer), the $CO_2$ absorption rate was dramatically enhanced and absorption quickly reaches full capacity. The present disclosure also demonstrates that the $CO_2$ absorption into the modified, porous metallic substrate supported ionic liquid, is fully reversible. Absorbed $CO_2$ can be removed by pulling a vacuum at the temperatures of 20 to 120° C., 40 to 80° C.

As shown, certain embodiments of the disclosed membrane may comprise thin films of polymeric ionic liquids prepared on, e.g., meso-porous or micro-porous modified metal oxide substrates by polymerizing the monomers inside the meso-pores or micro-pores by filling the support pores with the monomer solution.

The liquid fluid may include catalysts to promote $CO_2$ absorption/desorption kinetics in the liquid and selectivity of $CO_2$ over the other molecules. Previously it was suggested that $CO_2$ absorption and reaction with $H_2O$ and $OH^-$ to form $HCO_3^-$ could be promoted by catalyst additives, such as carbonic anhydraze and sodium arsenite. As a result, $CO_2$ permeability through an immobilized cesium bicarbonate solution film was enhanced by a factor 6. However, the catalytic promotion effect diminished within a few days due to loss of enzyme activity. The sodium arsenite promoted the water permeability by a factor of 3, but it is a very toxic material.

Presently disclosed separation processes involve $CO_2$ absorption into the ionic liquid of the membrane via a gas/liquid reaction process rather than just physical absorption. The membrane permeance is determined by the reaction rate and liquid-phase diffusion rate. Catalyzing $CO_2$ absorption/desorption processes in a salt solution avoids the reaction processes from being a rate-limiting step. Catalysts for certain embodiments of the disclosed membranes are listed in Table 3.

TABLE 3

| | Catalysts |
|---|---|
| Soluble catalysts | Metal chlorides ($ZnCl_2$, $PdCl_2$, $CuCl_2$, $CrCl_2$, $Ni(PPh3)_2Cl_2$) |
| | Ru complexes |
| Solid catalysts | Meso-porous solids ($TiO_2$, silica, ceria, γ-alumina) |
| | Meso-porous solids impregnated with (Ni, Ru, Cu, CuNi, CuZn, Au, Pd) |

Soluble catalysts may be directly added into the ionic liquid to form a homogenous mixture. For the micro- or mesoporous catalysts, the ionic liquid is impregnated into the pores of the catalysts. The modification layer may also act as a solid catalyst. The solid catalysts can also be deposited onto the porous metal support by common catalyst preparation techniques, such as impregnation and vapor deposition. Different ionic liquid/catalyst combinations were tested in a substantially identical reactor (FIG. 6a) under substantially the same conditions. For testing purposes, the ionic liquid was added with soluble catalysts loaded into a structured absorption bed of fixed G/L interface area and liquid thickness so that the adsorption/desorption kinetics of different ionic liquids were fairly compared (FIG. 6b). In the case of the ionic liquid/solid catalyst tests, different ionic liquids are supported on the same meso-porous solid particle, and the solid particle is packed inside a reactor tube of fixed diameter and length. The absorption/desorption kinetics were tested with the simulated flue gas mixture over the temperature range of 20 to 80° C. The kinetics of individual gases was obtained by measuring breakthrough curves of the individual gas components as a gas mixture was continuously fed into the absorption bed. In this way, relative selectivity of $CO_2$ over other gases and absorption capacity of individual gas was determined. An ionic liquid/catalyst combination is typically not suitable when the absorption is not reversible and/or $CO_2$ absorption rate is too slow relative to the membrane permeance requirement.

The $CO_2$ permeance into the ionic liquid can be roughly estimated from the absorption test by the following equation:

$$P_{sorption} = \frac{n_{gas} \cdot \Delta(x_{in} - x_{out})}{SA_{G/L} \cdot P_{CO2,in}}$$

$P_{sorption}$=permeance of $CO_2$ sorption, mol/s/Pa/m²
$n_{gas}$=molar flow rate of the feed gas mixture, mol/s
$x_{in}$=molar fraction of $CO_2$ in feed
$x_{out}$=molar fraction of $CO_2$ in the outlet
$SA_{G/L}$=total interface area of gas/ionic liquid, m²
$P_{CO2,in}$=partial pressure of $CO_2$ in the feed gas, Pa The sorption permeance would decrease as the absorption testing goes. Thus, the sorption permeance measured at the beginning of the absorption testing period is the upper limit. The highest sorption permeance is preferably greater or in the same order of magnitude as the targeted $CO_2$ membrane permeance, $1 \times 10^{-6}$ mol/m²/s/Pa. The sorption permeance will be validated by the desorption permeance. For the fully-reversible process, the two numbers should correlate well.

The disclosed immobilized liquid membranes, particularly those embodiments using ionic liquids, are well suited for selective $CO_2$ separation from a flue gas mixture. There are no significant differences in shape and/or size between $CO_2$ molecules and other inorganic gas molecules ($N_2$, $O_2$, and $H_2O$). Accordingly, a high selectivity of $CO_2$ cannot be obtained over the other molecules by use of a porous membrane alone. That is why in the presently disclosed membranes a layer of selective liquid immobilized on the membrane is used for $CO_2$ absorption and desorption. Molecular diffusion in a solid-state fluid is generally a few orders of magnitude lower than that in a liquid-phase fluid. In addition, a liquid-phase fluid is more flexible as to volume change upon significant $CO_2$ absorption than are solid-phase fluid separators.

Immobilization of the liquid fluid inside the relatively small pores of the metallic substrate modification layer dramatically increases the diffusion flux of the species in the liquid. In addition to reduction of the membrane thickness, the catalysis design further enhances the $CO_2/N_2$ selectivity and permeance of the disclosed membrane. The role of a catalysis-based process is discussed by using transport models illustrated in FIG. 4b and FIGS. 5a-5d.

Compared to straightforward physical absorption of $CO_2$ and diffusion of solvated $CO_2$ molecules (FIG. 4a the disclosed $CO_2$ transport process across the liquid fluid is enhanced by its reaction with a coupling agent (CA-H) of the catalyst as a liquid carrier (FIG. 4b). The coupling agent is a molecule containing Lewis or Brønsted basic functional groups. The reaction mechanism can be represented by $CO_2$ reaction with amines or ionic liquids. The $CO_2$ molecule attacks the free electron-pair of N atom and forms a new COO⁻ group, while another —NH— group accepts one H⁺ and becomes —NH$_2$— group.

At Interface of Gas with Membrane at the Feed Side:

Gas absorption: $CO_2$ (g) ⇌ $CO_2$(l)

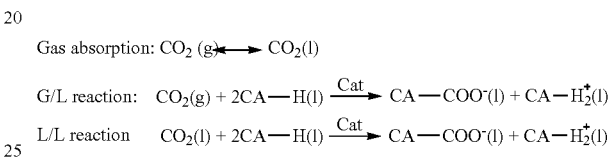

At Interface of Gas with Membrane at the Permeate Side:

Gas absorption: $CO_2$ (l) ⇌ $CO_2$(g)

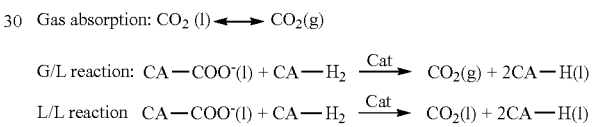

Carbon dioxide loading into the liquid increases with the concentration of the coupling agent. The selective reaction of $CO_2$ with the coupling agent over the other molecules makes the facilitated transport process prevail over the physical absorption. In this way, both high $CO_2$ selectivity and permeance are obtained, because the selectivity difference in physical absorption between $CO_2$ and other molecules is small.

A partial pressure gradient of $CO_2$ between the feed and permeate drives the dynamic reaction and transport processes of these species inside the liquid. Thus, catalyzing gas/liquid and liquid/liquid reactions of the coupling agent with $CO_2$ at the feed side enhances the concentration of dissolved (reacted) $CO_2$ in the solution at the G/L interface, and catalyzing the reverse reaction at the permeate side enables rapid release of $CO_2$ back into the gas phase.

The role of the catalyst in the membrane transport process is similar to typical catalytic reaction processes in that the reaction rate is enhanced while the thermodynamic equilibrium is not affected. The $CO_2$ loading into the solution is expected to increase with the concentration of the coupling agent, and thus, the coupling agent concentration in the fluid is preferably maximized. When an ionic liquid is used, the ionic liquid molecule itself contains the coupling agent (e.g., —NH— or —NH$_2$— functional groups). In certain embodiments, the modification layer also acts as a catalyst providing the coupling agent. In these cases, the concentration is no longer a concern, and the key is to have fast reaction kinetics and diffusion rate.

The catalysis function is incorporated into the disclosed membranes through four possible immobilization strategies (see FIGS. 5a-d). The $CO_2$-selective fluid is immobilized inside micro-pores or meso-pores of the modification layer on the metallic substrate surface by adhesion, such as capillary forces. As described by the following equation, the pore radius, $R_p$, surface tension, $\sigma$, and contact angle, $\theta$, are all controllable parameters to keep the liquid be firmly trapped inside the pore.

$$\Delta P_c = \frac{2\sigma \cdot \cos(\theta)}{r_p}$$

In one method (FIG. 5a), an ionic liquid fluid promoted by soluble catalyst additives is directly immobilized inside micro- or meso-pores of a metal oxide modification layer supported on a porous metal substrate. In a second method (FIG. 5b), the micro-porous or meso-porous modification layer itself is the catalyst that facilitates $CO_2$ absorption and desorption (see, e.g., Table 2). To assure that the liquid fluid is fully retained and not to be entrained away by the feed gas or leak into substrate structure, methods (c) or (d) (FIGS. 5c-d) can be used. In those two methods, non-catalytic and catalytic, respectively, a micro-porous or meso-porous modification layer is coated on a macro-porous, metallic substrate to hold the fluid that is immobilized inside the macro-pores of the metal support.

Carbon dioxide absorption/desorption kinetics is expected to be dramatically enhanced by supporting the ionic liquid in a porous substrate or porous modified substrate, and effectiveness of ionic liquids supported on the micro- or meso-porous modification layer or substrate has been shown for several catalytic reactions in the catalysis field.

The liquid fluid of the presently disclosed membranes is firmly immobilized on the modified, porous substrate by contacting liquid fluid (such as the ionic liquid) with the modified surface of the metallic substrate. The non-modified side of the substrate may be covered by a temporary plastic film to prevent its incidental contact by the liquid. The liquid/support contacting can be conducted by use of either impregnation or dip-coating techniques. Upon exposure of the (coated or uncoated) pores of the substrate to the liquid solution, the liquid gradually penetrates into the pores, driven by capillary force. Excess liquid may be wiped away after the substrate is removed from the solution.

For a given liquid fluid/membrane substrate system, temperature, liquid/substrate contact time, and gas environment are controllable operation variables. The temperature affects viscosity and surface tension of the liquid fluid, while the contact time or soaking time is related to the liquid penetration rate. The dip coating may be conducted in a particulate-free environment. For coating of hydrophobic liquids into a hydrophobic pore surface, the dip coating may be conducted in a dry box to minimize implication of ambient moisture to the liquid/solid surface adhesion.

Figure 10:
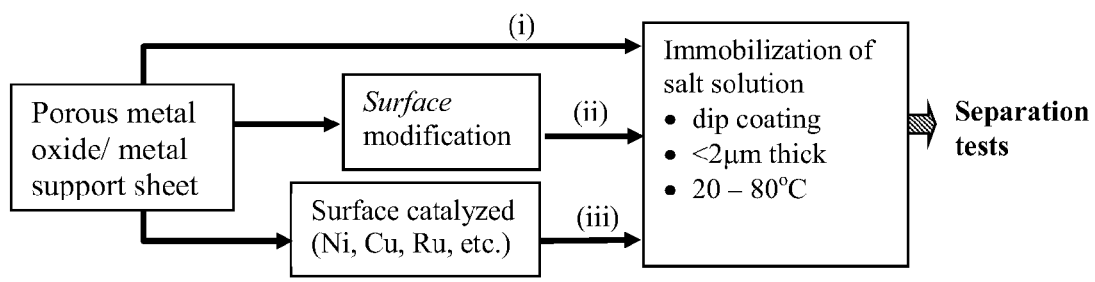
FIG. 10 is a flow chart illustrating three embodiment of the disclosed process for immobilization of an ultra-film liquid membrane on the metal/oxide substrate.

Three possible methods for immobilizing the liquid fluid on the metal oxide/metal substrate are illustrated in FIG. 10. The metal substrate is dip coated in the liquid fluid, with or without soluble catalyst additive (Process option (i) of FIG. 10). The liquid fluid should be taken up into the pores spontaneously upon exposure of the pores of the substrate to the liquid. If the as-prepared substrate is not effective for spontaneous immobilization, however, the substrate surface chemistry and/or pore structure is modified. For example, polydimethylsiloxane (PDMS) moleculars may be deposited on the substrate surface by evaporation at 235° C. to change the surface to be highly hydrophobic to obtain complete wetting of the support pores by the respective ionic liquid (Process option (ii) of FIG. 10).

In a third immobilization method the porous metal oxide modification layer is catalyzed with transition metals prior to the liquid immobilization (Process option (iii) of FIG. 10). Meso-porous silica, $TiO_2$, $CeO_2$, and $\gamma$-alumina are active supporting materials for solid catalysts. The catalyzing process can be performed by typical impregnation technique, which results in highly-dispersed metal particles (e.g., 1 nm) inside the meso-porous substrate. The transition metal catalysts, such as Ni, Cu, Fe, and Ru may have a loading level of about 10 wt % relative to the meso-porous oxide substrate. The precious metal catalysts, such as Au, Pd, Pt, and Rh, may have a loading level of about 1 wt %. Since the catalyzed support thickness is preferably less than 2 µm, the amount of loading of the precious metal catalyst per unit membrane surface is very small.

The disclosed metal-supported membranes can be manufactured using a roll-to-roll production process offering yet further relatively low manufacturing costs, especially as compared to planar polymeric membrane modules that are currently used in large-scale industrial applications such as waste-water treatment plants One application for use of the membranes of the present invention is for $CO_2$ gas separation from flue gas streams. Table 4 summarizes likely flue gas process conditions encountered at the industrial scale and on industrial sites.

TABLE 4

Flue gas $CO_2$ capture process conditions

| Dry gas composition | A model mixture | Simulated gas mixture |
|---|---|---|
| $CO_2$, vol % | 15% | 15% |
| $O_2$, vol % | 4% | 4% |
| $N_2$, vol % | 81% | 81% |
| $SO_2$, vPPM | | 200 |
| NO, vPPM | | 80 |
| $H_2O$ relative humidity | 60~100% | 60~100% |
| Temperature, ° C. | 20 to 80 | 20 to 80 |
| Feed, psia | 14.6 to 20 | 14.6 to 20 |
| Permeate, psia | 0.0 to 0.5 | 0.0 to 0.5 |

Figure 11:
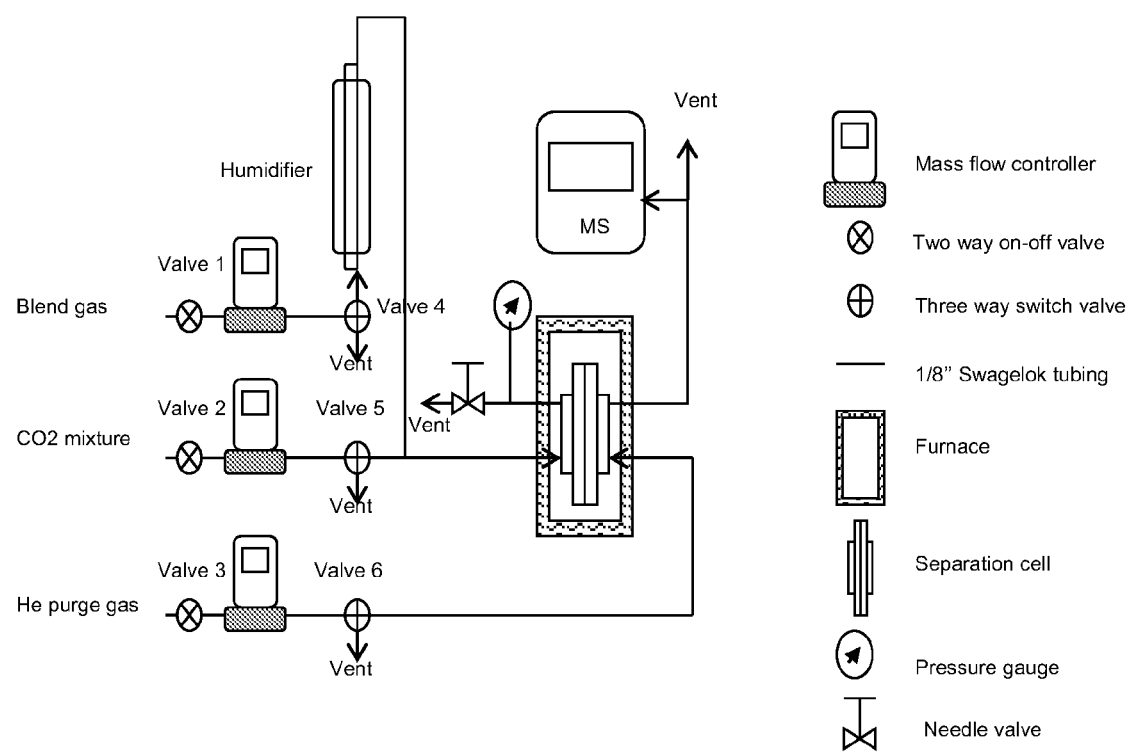
FIG. 11 illustrates configuration of a test apparatus for gas-phase permeability and separation characterization of the disclosed membranes.

Certain embodiments of the disclosed membranes were characterized for permeability and separation performance (with results shown in the examples) using the apparatus illustrated in FIG. 11. The membrane testing cell consisted of a feed chamber, a permeate chamber, a porous stainless steel supporting disc and O-rings for the sealing. The testing cell was housed in the oven for temperature control. The $CO_2$ gas mixture typically comprising $CO_2/O_2/N_2$=15.3:5.3:balance (molar ratio) and purge gas comprising helium were used in the respective feed and permeate sides. The dry $CO_2$ gas mixture was flowed through a humidifier to moisturize (humidify) the gas stream in order to replicate likely industrial-use environments. The helium purge gas is introduced in the permeate side to create a partial pressure differential of $CO_2$ between the feed and permeate chamber, and is used for measurement of the membrane separation performance characteristics analyses. In actual membrane separation processes, the $CO_2$ permeate is pulled out of the permeate chamber by vacuum. The gas composition of the feed and permeate gas stream was analyzed by use of mass spectrometer gas analyzer. The membrane separation performance is typically characterized by permeance and separation factor which can be calculated from the experimental measurements with the following equations:

$$P_i = \frac{F_{i,p}}{SA_m \cdot \Delta P_i}$$

$$S_{ij} = \frac{(y_i/y_j)_p}{(x_i/y_j)_f}$$

$P_i$: permeance of specie i, mol/m²/s/Pa
$S_{ij}$: separation factor of specie i to j
$SA_m$: working surface area of membrane $F_i$: permeation flow rate of specie i, mol/s
$\Delta P_i$: partial pressure differential of species i between the feed and permeate side
$y_i$: molar fraction of specie i in permeate side
$y_j$: molar fraction of specie j in permeate side
$x_i$: molar fraction of specie i in feed side
$x_j$: molar fraction of specie j in feed side The meso-porous silica, meso-porous $TiO_2$, and microporous silicalite zeolite membrane were deposited on the disclosed porous inorganic substrates such as the metal substrates to provide high permeance and good adhesion of the immobilized liquid. The oxide modification layers at such a small pore size (a few nm or less than 1 nm) make it possible to firmly immobilize the liquid fluid since the capillary force increases with decreasing pore size. As shown in FIG. 14, gas permeance of the resulting silicalite zeolite membrane, $TiO_2$ modification layer of 5 nm pore size, and meso-porous silica of 3 nm pore size well exceed the target $CO_2$ membrane permeance of $1 \times 10^{-6}$ mol/m²/Pa/s. The prior art $CO_2/N_2$ separation membrane of PVAm/PPO composite membrane showed the highest $CO_2$ permeance available prior to the present invention, which reached the limit of permeance of the PPO hollow fiber support itself.

Figure 22A:
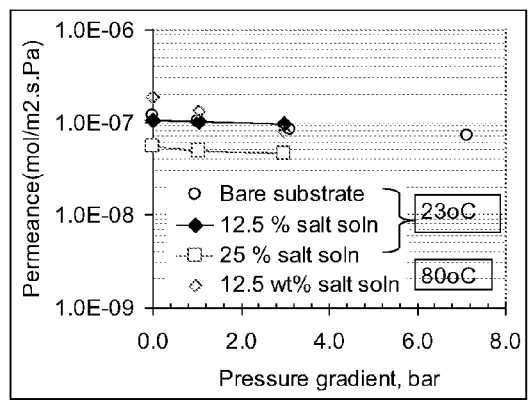
FIGS. 22a and 22b show permeance results from a $CO_2$ separation process using different embodiments of the disclosed immobilized liquid membrane in different separation environments as described in Example 2.
Figure 22B:
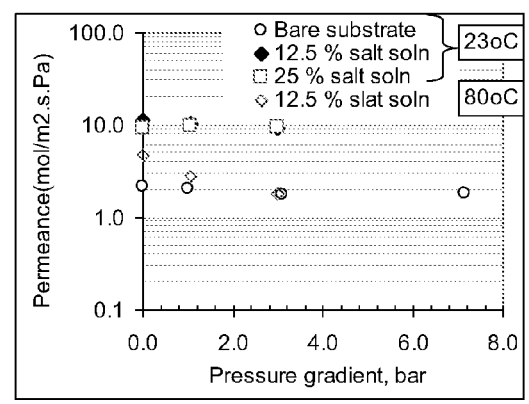

Tests were also performed to assess the immobilizing liquid membranes on the disclosed substrates. A 12.5 wt % sodium glycinate solution was soaked into the pores of 50 μm thick porous Ni substrate. The other side of the Ni substrate was coated by a silicalite zeolite membrane. Excess solution on the exterior surface of the Ni substrate was removed. As shown in FIGS. 22a and 22b, the $CO_2$ permeance and $CO_2/N_2$ selectivity were measured with a humidified $CO_2$ gas mixture at room temperature. The carbon dioxide permeance was around $1 \times 10^{-7}$ mol/m²/s/Pa although the $CO_2/N_2$ separation factor is not high, selective $CO_2/N_2$ separation was shown. The salt solution was well held by the silicalite zeolite membrane modification layer, and the solution was intact when the pressure gradient between the feed and permeate was raised to 3 bar. By reducing the liquid membrane thickness from 50 μm of this example to less than 2 μm with the embodiment of the membrane structure shown in FIG. 5, the $CO_2$ permeance is increased to above $1 \times 10^{-6}$ mol/s/m²/Pa, while the $CO_2/N_2$ selectivity is increased to above 100 by use of the optimized ionic liquid/catalyst combinations. Loading capacity of $CO_2$ in 10 wt % sodium glycinate (SG) at 40° C. can be as high as 0.7 mol $CO_2$/mol SG at $P_{CO2}=100$ kPa under equilibrium.

As shown in FIGS. 18a and 18b, the disclosed membrane unit may comprise one membrane or may comprise multiple membranes to form a membrane module for large-scale (industrial-scale) $CO_2$ gas separation applications. Individual membranes may be assembled to form a manifold or other type assembly based on the proposed specific application of the membrane module. Such membrane modules perform $CO_2$ separation on an industrial scale with low pressure drop to withdraw permeate gas under vacuum, minimal pressure drop for flue gas pass-through, are resistant to corrosion, and/or provide for easy installation and flexibility for replacement. The multiple membranes may be placed in parallel or series.

Figure 20A:
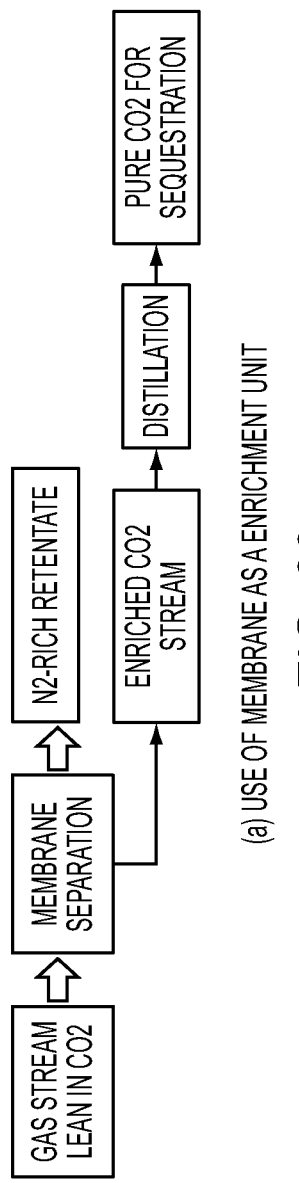
FIGS. 20a and 20b illustrate two possible application process schemes using certain embodiments of the immobilized liquid membrane separation units disclosed.
Figure 20B:
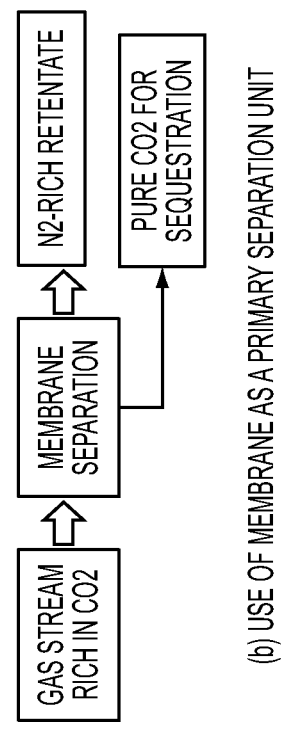

As illustrated in FIG. 19, use of the presently disclosed membranes or membrane modules provides low-cost $CO_2$ separation at an industrial scale. Specifically, the $CO_2$ permeate is pulled from the membrane module via vacuum. The vacuum may be generated by known means, such as via use of low quality steam. This process can utilize waste energy to pump the $CO_2$ from the membrane module, using less than about 15% or 10% of the consumption of coal energy at a relatively low cost. As shown in FIGS. 20a and 20b, respectively, the membrane modules may be used as $CO_2$ enrichment unit or as a primary separation unit.

Energy consumption was calculated by determining the required coal feed rate or total heating rate is increased by 47.7% via adding the amine $CO_2$ absorption process into a sub critical power plant (Table 5). This is attributed to two major factors, (i) large amounts of steam being used to regenerate the saturated solvent and (ii) electrical power being consumed to run the $CO_2$ capture plant and compress the $CO_2$ gas. No heat input is needed to conduct membrane separation. The electrical power is the dominant energy consumer to run the membrane separation and compress the purified $CO_2$ gas stream. From the thermodynamic point of view, energy is always required to change the $CO_2$ state from a gas mixture of partial pressure of about 0.15 bar to a pure gas of partial pressure 100 bar. Mechanical vacuum pumps and compressors, which are powered by electricity, are assumed to operate the membrane separation process. Thus, major savings in energy efficiency by use of the membrane technology disclosed herein results from elimination of thermal energy inputs for $CO_2$ capture process. This means that increases of heat rate is reduced from 48% for the amine process to about 16.7% for the membrane separation devices and processes disclosed herein, with very significant energy savings.

TABLE 5

Energy balances of a power plant with and without $CO_2$ capture

| $CO_2$ Capture | Base | Amine | Membrane |
| --- | --- | --- | --- |
| Net power output (MW) | 550 | 550 | 550 |
| Total heat rate, Btu/kWh | 9,276 | (48%) | (16.7%) |
| Increase due to solvent regeneration | | (31.4%) | 0 |
| Increase due to power consumption | | (16.6%) | (16.7%) |
| Efficiency (HHV), % | 36.8 | 25 | 31.7 |

Large amounts of thermal energies are wasted during condensation processes in steam power generator units. The power consumption for the membrane separation devices disclosed herein are further reduced when such waste steam is used to generate a vacuum to drive the membrane separation modules instead of using mechanical vacuum pumps.

The proposed membrane separation devices may also be integrated into existing coal-fired power plants. The disclosed membrane devices can be installed after the flue gas desulfurization (FGD) unit and before the discharge stack, which is the same location as proposed for amine scrubbing. Fine solid particulates and sulfur dioxide are substantially reduced after the FGD process. Resulting flue gas becomes cleaner and is appropriate for stable operation of the membrane separation. The membrane separation temperature can be slightly adjusted by heating up the FGD off gas with waste hot streams or by cooling down the FGD off gas with cooling water. Likely operating temperatures may range from 20 to 80° C. although the membranes of the present invention may be operable in applications requiring separation of carbon dioxide at a range from −50 to 300° C.

Figure 17A:
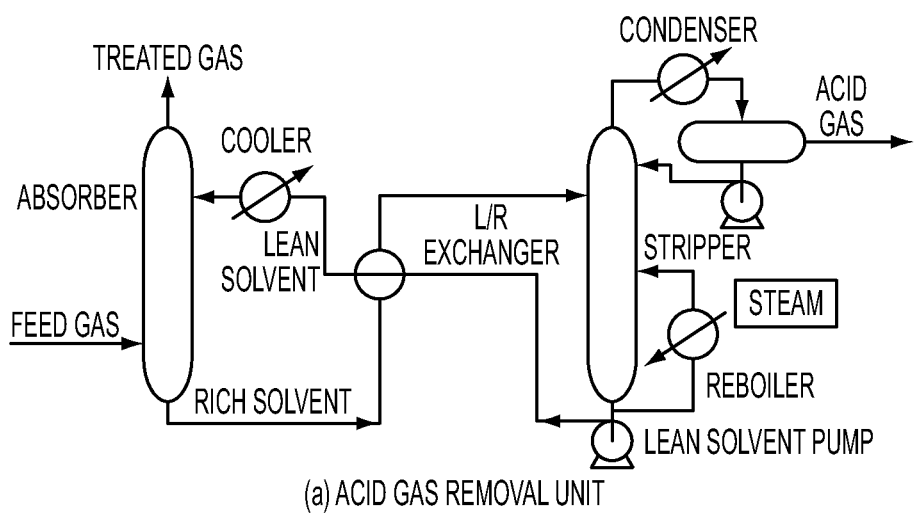
FIG. 17a is a flow diagram for a conventional amine solvent scrubbing unit.
Figure 17B:
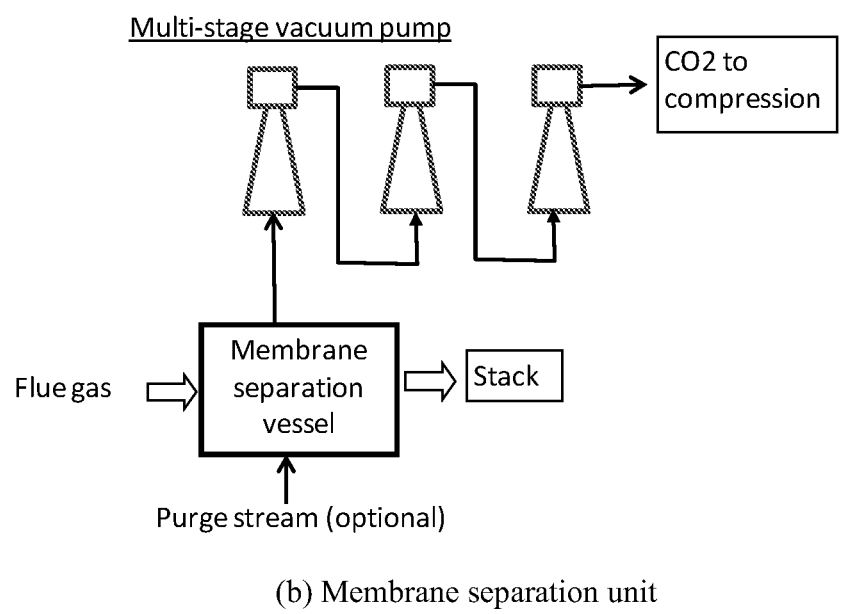
FIG. 17b is a flow diagram for an embodiment of the disclosed membrane separation unit.

Compared to prior art solvent absorption processes (FIG. 17a) the membrane separation devices and processes disclosed herein have a simple flow diagram (FIG. 17b). As the flue gas flows over the modified side of the disclosed membrane, $CO_2$ is selectively pulled out across the membrane from the feed side of the membrane by vacuum. No heating and/or cooling are needed. Multi-stage membrane separation vessels may be arranged to manage the pressure driving force requirements. Multiple compartments of a membrane module can also be arranged for flexible repair/maintenance of the membrane unit. The membrane module can be designed in such a way to minimize the pressure drop of the flue gas passing through and to maximize the membrane surface area that is exposed to the flue gas in a given volume.

At typical flue gas temperatures, the thermal stability of the disclosed membrane has long durability. Potential corrosion of the porous metal substrate is mitigated by: the selective fluid layer prevents the substrate from directly contacting with the flue gas, which contains water vapor and small amounts of $SO_x$ and $NO_x$; the permeate is maintained in the vapor phase and there is no condensed water or water solution inside the porous metal substrate; the porous metal substrate is optionally modified to be corrosion resistant; and/or the metal substrate is optionally made using corrosion resistant materials.

In addition to the selectivity and/or permeance, chemical and physical stability are other factors promoting the use of an ionic liquid in the disclosed membranes. Ionic liquid has no substantial volatility at typical flue gas temperatures and remains inside the pores for long-term operation. Some ionic liquids are disclosed for use with the present invention membranes, which tolerate the presence of large amounts of $SO_2$.

About 500,000 $m^2$ of membrane separation surface area is required to capture 4.0 mM ton/year $CO_2$ from a 550 MWe power plant with a membrane permeance of $1.0 \times 10^{-6}$ mol/$m^2$/s/Pa. This membrane area and scale is comparable to that used in the membrane reactor for industrial waste water treatment. With a membrane packing density of 1000 $m^2/m^3$, the presently disclosed membrane module volume is 500 $m^3$. As compared to conventional separation devices, the present invention allows for a compact separation unit, which is comparable to the SCR reactor volume and is about 1 to 2 orders of magnitude smaller than the absorption tower volume in an amine process. The weight of material components for such an industrial membrane plant is estimated in Table 6 for a separation unit to process 4.0 mM ton/year $CO_2$ capture with a 485,625 $m^2$ membrane area. The total module weight may be 150 ton, which is in the same order of magnitude for a typical industrial catalytic reactor. The use of the 50 μm-thick metal substrates and modification layers for the presently disclosed membranes dramatically reduces the raw material consumption and the weight of the separation unit.

TABLE 6

Material weight for industrial membrane separation unit

|  | Porous metal substrate | Metal oxide modification layers | Ionic liquid fluid film | Spacer - dense polymeric |
|---|---|---|---|---|
| Thickness, μm | 50 | 5 | 1 | 100 |
| Density, g/cc | 4 | 1.2 | 1 | 1 |
| Material volume, $m^3$ | 24.3 | 2.4 | 0.5 | 48.6 |
| Material weight, T | 97.1 | 2.9 | 0.5 | 48.6 |

By use of a non-volatile ionic liquid fluid, there are no polluting air emissions. Since the membrane separation is conducted in the gas or vapor phase there is no liquid waste streams produced. The spent membrane module can be retrieved from the plant and recycled; the majority of the metal substrate and spacer materials can be re-used and the membrane separation layer is removed and rejuvenated.

EXAMPLES

Example 1

$Cs_2CO_3$ Liquid Fluid Immobilized in a Substrate

Figure 21A:
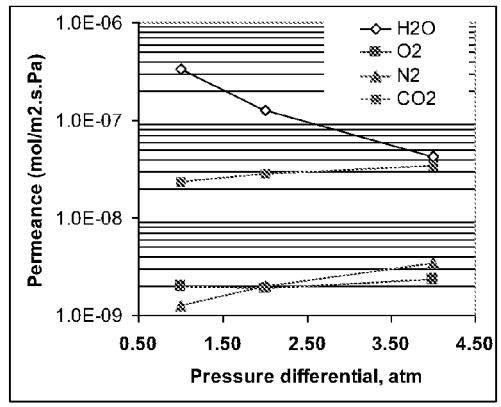
FIGS. 21a and 21b show results of $CO_2$ separation and permeance using an embodiment of the disclosed immobilized liquid membrane with immobilized aqueous $Cs_2CO_3$ solution, a feed gas comprising $CO_2/O_2/N_2$=15.3/5.3/bal, 87% RH, and at room temperature.
Figure 21B:
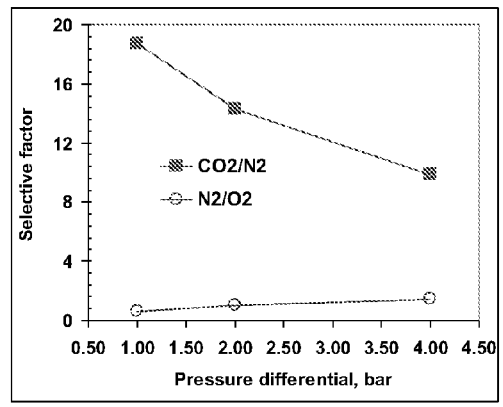

A silicalite-modified, 50 μm-thick porous Ni alloy sheet as illustrated in FIG. 2a was used as the support structure. A $Cs_2CO_3$ solution was prepared by dissolving 14.1 g $Cs_2CO_3$ in 5.2 g D.I. water. The solution was diluted 4 times to reach salt/$H_2O$ weight ratio of 0.68/1. One drop (0.012 g) of the $Cs_2CO_3$ solution was poured on the Ni side only of the 11/16 inch support coupon. Thus, when the liquid membrane was prepared, the substrate was put on a flat surface horizontally, with the Ni side facing upward. The liquid fluid was dropped on the Ni surface. The silicalite surface, which was facing downward, did not have contact with the liquid fluid; the drop spread quickly to cover the entire Ni surface and quickly soaked into the Ni substrate pores. Excess solution was removed by wiping from the Ni surface until the center of the Ni disc appeared to be dry. The net weight gain of the membrane after wiping was 0.006 g. As shown in FIGS. 21a and 21b, $CO_2$ separation performance of immobilized aqueous $Cs_2CO_3$ solution with a feed gas of $CO_2/O_2/N_2$=15.3/5.3/bal, an 87% RH, and at room temperature.

The different feed $CO_2$ gas pressures were tested while the permeate side was maintained under atmospheric pressure with helium gas purge. The membrane showed stable performance in the 87% RH. The permeance and selectivity were measured under steady-state separation conditions. It is clearly demonstrated that the disclosed membrane substrate withstands a pressure gradient between the feed and permeate of more than 1 bar. The immobilized liquid remained intact under the 4-bar pressure gradient. That means that the membrane of this example can withstand higher pressure gradients than 4 bar. In addition, the aqueous salt solution used in this example has much lower viscosity than the ionic liquid and amino acid salt solutions. Thus, immobilization of the higher viscosity liquid fluid is possible.

The $H_2O$ permeance decreased with the pressure gradient, while the $CO_2$ permeance slightly increased with the pressure gradient. These results suggest that the molecular permeance mechanism through the membrane does not follow simple first-order correlation with the pressure gradient. The permeance would be a constant number if the permeation flux was proportional to the partial pressure gradient of $CO_2$. Clear $CO_2/N_2$ separation is shown. The selectivity factor is above 10.

The liquid fluid was immobilized inside the 50-μm thick macro-pores of the porous metallic substrate to show the membrane capabilities on a large-scale since the permeance has an inverse first-order dependence on the membrane layer thickness. The permeance is proportionally increased by reducing the thickness of the immobilized liquid fluid layer, such as immobilizing the aqueous salt solution onto a hydrophilic meso-porous modification layer as illustrated in FIGS. 5a and 5b.

Example 2

Sodium Glycinate Solution Immobilized in the Substrate of Example 1

Equal molar portions of NaOH and sodium glycinate were dissolved in water (7.5 g glycine plus 34.5 g $H_2O$, dissolve plus 4 g NaOH, dissolved to obtain a 25% wt sodium glycinate solution). The salt solution was further diluted by a factor of 2 to result in a 12.5% solution. The two solutions were put into the ultrasonic for 20 mins for homogenization. The two solutions were immobilized on the respective substrates of the silicalite-coated porous Ni alloy sheet in a manner similar to the above example. $CO_2$ separation performance of the immobilized sodium glycinate solution was tested using a feed gas of $CO_2/O_2/N_2$=15.3/5.3/bal at 71% RH. The results obtained under steady state conditions are plotted in FIGS. 22a and 22b. The support structure, 12.5% immobilized salt solution, and 25% immobilized salt solution were tested at room temperature (23° C.), while the 12.5% immobilized salt solution was also tested at 80° C. Again, the disclosed membrane showed excellent ability to immobilize the liquid fluid to withstand pressure gradients. The liquid fluid was intact under 3-bar pressure gradient at both temperatures used in this example.

As can be seen in FIGS. 22a and 22b, the bare support itself showed $CO_2/N_2$ selectivity factor as around 2. The separation factor was increased to about 10 with the immobilized salt membrane. The 12.5 and 25 wt % salt solutions showed similar $CO_2/N_2$ separation factors. However, $CO_2$ permeance of the 12.5 wt % is consistently higher than that of the 25 wt % at different pressure gradients. The selectivity factor of the immobilized 12.5 wt % salt solution was reduced at the higher separation temperature, while its $CO_2$ permeance was only increased slightly at the higher separation temperature. This example shows that the selectivity and $CO_2$ permeance of the membrane disclosed can be optimized by using appropriate $CO_2$-selective liquid fluids.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A separation apparatus comprising:
   a membrane having a first side and a second side, the membrane capable of selective permeation of carbon dioxide from the first side to the second side of the membrane, the separation driven by a chemical potential gradient of carbon dioxide, the membrane comprising:
      a macro-porous metallic substrate having a plurality of pores having a mean pore size of micrometers or sub-micrometer size and a porosity of from 35% to 70%;
      a micro-porous and/or meso-porous modification layer, the modification layer comprising TiO2, silica, ceria, γ-alumina, meso-porous solids impregnated with Ni, Fe, Ru, Cu, CuNi, Cu, Zn, Au, Pd, and mixtures thereof, modifying pore openings and/or modifying a surface chemistry on the first side of the porous metallic substrate, forming a permanent support structure;
      a liquid fluid immobilized within pores of the modified metallic substrate; and
      the liquid fluid capable of allowing carbon dioxide molecules to (i) selectively absorb relative to other types of molecules, (ii) be mobile in the liquid fluid, and (iii) desorb from the liquid fluid into a gas phase on the second side of the membrane.

2. The separation apparatus of claim 1, wherein the liquid fluid is stable under operating temperatures between −50 to 300° C.

3. The separation apparatus of claim 1, wherein the liquid fluid is an amine-based or carbonate-based solution.

4. The separation apparatus of claim 1, wherein the liquid fluid comprises an amino acid salt solution or an ionic liquid.

5. The separation apparatus of claim 4, wherein the ionic liquid comprises an ammonium-based ionic liquid monomer and/or its corresponding polymers.

6. The separation apparatus of claim 1, wherein the porous metallic substrate is nickel, nickel alloy, titanium, and/or stainless steel.

7. The separation apparatus of claim 1, wherein the micro-porous modification layer has a mean pore size between 0.3 nm to 2 nm.

8. The separation apparatus of claim 1, wherein the meso-porous modification layer has a mean pore size between 2 nm to 50 nm.

9. The separation apparatus of claim 1, wherein the liquid fluid includes a catalyst comprising ZnCl2, PdCl2, CuCl2, CrCl2, Ni(PPh3)2Cl2), and/or Ru complexes, the catalyst capable of facilitating a $CO_2$ absorption reaction.

10. The separation apparatus of claim 1, wherein an interior surface of the macro-porous metallic substrate is catalyzed with $ZnCl_2$, $PdCl_2$, $CuCl_2$, $CrCl_2$, $Ni(PPh_3)_2Cl_2$, Ni, Ru, Cu, CuNi, CuZn,Au, Pd, and mixtures thereof.

11. The separation apparatus of claim 1, wherein the modification layer comprises silicalite and ZSM-5 zeolite.

12. The separation apparatus of claim 1, wherein the liquid fluid is immobilized inside the pores of the modification layer and the thickness of the immobilized liquid fluid is less than 10 μm.

13. The separation apparatus of claim 1, wherein the liquid fluid is immobilized inside the pores of the metallic substrate at a thickness of less than 100 μm.

14. The separation apparatus of claim 1, wherein the porous metallic substrate has a thickness of equal to or less than 200 microns.

15. The separation apparatus of claim 1, wherein the membrane is capable of separating $CO_2$ in a feed gas mixture from a flue gas of fossil fuels, the feed gas mixture including $CO_2$, $N_2$, $O_2$, $H_2O$, $SO_2$, and NO molecules.

16. The separation apparatus of claim 1, wherein the chemical potential gradient of $CO_2$ is a partial pressure differential of $CO_2$.

17. The separation apparatus of claim 1, wherein the membrane is capable of separating $CO_2$ from a feed gas mixture when the membrane is subjected to a gas pressure of 1 bar or greater on the first side of the membrane and a gas pressure less than 1 bar on the second side of the membrane by the feed gas mixture.

18. The separation apparatus of claim 1, further comprising a plurality of the membranes arranged in parallel to form a membrane module capable of industrial-scale $CO_2$ gas separation with reduced pressure drops at large gas flow rates.

19. A method comprising:
   providing a membrane having a first side and a second side, and selectively permeating and separating carbon dioxide from the first side to the second side of the membrane, the separation driven by a chemical potential gradient of carbon dioxide, forming the membrane by
      providing a macro-porous metallic substrate having a plurality of pores having a mean pore size of micrometers or sub-micrometer size and a porosity of from 35% to 70%;
      providing a micro-porous and/or meso-porous modification layer, the modification layer comprising TiO2, silica, ceria, γ-alumina, meso-porous solids impregnated with Ni, Fe, Ru, Cu, CuNi, Cu, Zn, Au, Pd, and mixtures thereof, modifying pore openings and/or modifying a surface chemistry on the first side of the porous metallic substrate;

providing a liquid fluid immobilized within pores of the modified metallic substrate and allowing carbon dioxide molecules to (i) selectively absorb in the liquid fluid relative to other types of molecules, (ii) be mobile in the liquid fluid, and (iii) desorb from the liquid fluid into a gas phase on the second side of the membrane.

20. The method of claim 19, wherein the chemical potential gradient of $CO_2$ is a partial pressure differential of $CO_2$.

21. The method of claim 19, wherein $CO_2$ is separated from a feed gas mixture when the membrane is subjected to a gas pressure of 1 bar or greater on the first side of the membrane and a gas pressure less than 1 bar on the second side of the membrane by the feed gas mixture.

22. The method of claim 19, wherein industrial-scale $CO_2$ gas separation is performed using a plurality of the membranes.

* * * * *